United States Patent
Siomina et al.

(10) Patent No.: US 9,544,105 B2
(45) Date of Patent: Jan. 10, 2017

(54) ENHANCED RECEIVER ADAPTATION BASED ON RELATION BETWEEN SIGNALS FROM AGGRESSOR AND VICTIM CELLS

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 14/400,843

(22) PCT Filed: May 14, 2013

(86) PCT No.: PCT/SE2013/050539
§ 371 (c)(1),
(2) Date: Nov. 13, 2014

(87) PCT Pub. No.: WO2013/172773
PCT Pub. Date: Nov. 21, 2013

(65) Prior Publication Data
US 2015/0148050 A1 May 28, 2015

Related U.S. Application Data
(60) Provisional application No. 61/646,534, filed on May 14, 2012, provisional application No. 61/646,522, (Continued)

(51) Int. Cl.
*H04L 5/00* (2006.01)
*H04J 11/00* (2006.01)
*H04L 27/26* (2006.01)

(52) U.S. Cl.
CPC ............ *H04L 5/0032* (2013.01); *H04J 11/005* (2013.01); *H04L 27/2605* (2013.01); *H04L 27/2607* (2013.01); *H04L 27/2647* (2013.01)

(58) Field of Classification Search
CPC .......... H04L 5/00; H04L 5/0032; H04B 15/00; H04B 1/40
See application file for complete search history.

(56) References Cited

U.S. PATENT DOCUMENTS
2007/0184811 A1   8/2007   Ballantyne
2011/0002283 A1   1/2011   Drugge et al.
(Continued)

FOREIGN PATENT DOCUMENTS
EP    1 914 901 A2    4/2008
WO    WO 2013/133761 A1    9/2013

OTHER PUBLICATIONS
International Search Report for International Application No. PCT/SE2013/050539 mailed Sep. 18, 2013, 3 pages.
(Continued)

*Primary Examiner* — Myron K Wyche
(74) *Attorney, Agent, or Firm* — Myers Bigel, P.A.

(57) ABSTRACT

A method in a first radio node for adapting a receiver type is described. The first radio node includes a first a second different receiver types. The first radio node is included in a wireless communications network, which further includes a second and at least one third radio nodes. The method includes adapting the receiver type to be one of the first and the second types in the first radio node, for receiving first signals from the second radio node, based on a relation between an activity of the first signals and second signals received from the at least one third radio node. The first signals include signals received from a first cell associated with the second radio node. The second signals include signals received from a second cell associated with the at
(Continued)

Various interference scenarios in heterogeneous deployments.

least third radio node. The at least third radio node causes interference on the first signals.

38 Claims, 12 Drawing Sheets

Related U.S. Application Data filed on May 14, 2012, provisional application No. 61/646,539, filed on May 14, 2012.

(56) References Cited

U.S. PATENT DOCUMENTS

| | | | |
|---|---|---|---|
| 2011/0009136 A1* | 1/2011 | Mantravadi | H04W 88/06 455/501 |
| 2012/0178386 A1* | 7/2012 | Pascolini | H04B 1/525 455/84 |
| 2014/0140319 A1* | 5/2014 | Doetsch | H04B 7/024 370/330 |

OTHER PUBLICATIONS

Written Opinion of the International Searching Authority for International Application No. PCT/SE2013/050539 mailed Sep. 18, 2013, 6 pages.

3GPP TS 36.211 V11.2.0 (Feb. 2013) $3^{rd}$ Generation Partnership Project; Technical Specification Group Radio Access Network; Evolved Universal Terrestrial Radio Access (E-UTRA); Physical Channels and Modulation (Release 11); 650 Route des Lucioles—Sophia Antipolis, Valbonne—France; 109 pages.

3GPP TS 36.133 V11.0.0 (Mar. 2012) $3^{rd}$ Generation Partnership Project; Technical Specification Group Radio Access Network; Evolved Universal Terrestrial Radio Access (E-UTRA); Requirements for support of radio resource management (Release 11); 650 Route des Lucioles—Sophia Antipolis, Valbonne—France; 569 pages.

3GPP TS 36.331 V11.3.0 (Mar. 2013) $3^{rd}$ Generation Partnership Project; Technical Specification Group Radio Access Network; Evolved Universal Terrestrial Radio Access (E-UTRA); Radio Resource Control (RRC); Protocol specification (Release 11); 650 Route des Lucioles—Sophia Antipolis, Valbonne—France; 344 pages.

* cited by examiner

Various interference scenarios in heterogeneous deployments.

Example interference scenario: a wireless device (UE) is receiving a DL signal (victim) from cell1 of BS1, the signal being interfered by other (aggressor) signals. (Notation: solid lines = communication links, dashed lines = interfering links.)

Example interference scenario: a wireless device's signal (victim) is received in UL in cell 1 of BS1 being interfered by other (aggressor) signals. (Notation: solid lines = communication links, dashed lines = interfering links.)

ENHANCED RECEIVER ADAPTATION BASED ON RELATION BETWEEN SIGNALS FROM AGGRESSOR AND VICTIM CELLS

CROSS REFERENCE TO RELATED APPLICATION

This application is a 35 U.S.C. §371 national stage application of PCT International Application No. PCT/SE2013/050539, filed on 14 May 2013, which itself claims the benefit of U.S. provisional Patent Application No. 61/646,534, filed 14 May 2012, U.S. Provisional Patent Application No. 61/646,522, filed 14 May 2012, and U.S. Provisional Patent Application No. 61/646,539, filed 14 May 2012, the disclosures and contents of all of which are incorporated by reference herein in their entirety. The above-referenced PCT International Application was published in the English language as International Publication No. WO 2013/172773 A1 on 21 Nov. 2013.

TECHNICAL FIELD

The present invention relates to methods and apparatus for communicating in a wireless communication system.

BACKGROUND

Interference Cancellation/Mitigation Capable Receivers

In Universal Mobile Telecommunications System/High-Speed Downlink Packet Access (UMTS/HSDPA) several interference aware receivers have been specified for the User Equipment (UE). They are termed as 'enhanced receivers' as opposed to the baseline receiver (rake receiver). The UMTS enhanced receivers are referred to as enhanced receiver type 1 (with two-branch receiver diversity), enhanced receiver type 2 (with single-branch equalizer), enhanced receiver type 3 (with two branch receiver diversity and equalizer) and enhanced receiver type 3i (with two branch receiver diversity and inter-cell interference cancellation capability). The new receivers can be used to improve performance, e.g., in terms of throughput and/or coverage.

In Long Term Evolution Release-10 (LTE Rel-10), enhanced interference coordination techniques have been developed to mitigate potentially high interference, e.g., in a cell range expansion zone, while providing the UE with time-domain measurement restriction information. Further, for LTE Release-11 (LTE Rel-11), advanced receivers based on Minimum Mean Square Error-Interference Rejection Combining (MMSE-IRC) with several covariance estimation techniques and interference-cancellation-capable receivers are being currently studied. In future even more complex advanced receivers such as Minimum Mean Square Error-Successive Interference Cancellation (MMSE-SIC), which is capable of performing nonlinear subtractive-type interference cancellation, can be used to further enhance system performance.

Such techniques generally may benefit all deployments where relatively high interference of one or more signals is experienced when performing measurements on radio signals or channels transmitted by radio nodes or devices, but are particularly useful in heterogeneous deployments.

However, these techniques involve also additional complexity, e.g., may require more processing power and/or more memory. Due to these factors such receiver may be used by the UE for mitigating interference on specific signals or channels. For example a UE may apply an interference mitigation or cancellation technique only on data channel. In another example a more sophisticated UE may apply interference mitigation on data channel as well as on one or two common control signals; examples of common control signals are reference signal, synchronization signals etc.

It should be noted that the terms interference mitigation receiver, interference cancellation receiver, interference suppression receiver, interference rejection receiver, interference aware receiver, interference avoidance receiver etc are interchangeably used but they all belong to a category of an advanced receiver or an enhanced receiver. All these different types of advanced receiver improve performance by fully or partly eliminating the interference arising from at least one interfering source. The interfering source is generally the strongest interferer(s), which are signals from the neighbouring cells when the action is performed in the UE. Therefore a more generic term, 'enhanced receiver', which covers all variants of advanced receiver, is used hereinafter. Further, the corresponding interference handling techniques (e.g., interference cancellation, interference suppression, puncturing or interference rejection combining) for enhanced receivers are termed 'enhanced receiver technique' herein.

Heterogeneous Deployments

In 3rd Generation Partnership Project (3GPP), heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adopt for the traffic needs and the environment. However, heterogeneous deployments bring also challenges for which the network has to be prepared to ensure efficient network operation and superior user experience. Some challenges are related to the increased interference in the attempt to increase small cells associated with low-power nodes, aka cell range expansion; the other challenges are related to potentially high interference in uplink due to a mix of large and small cells.

According to 3GPP, heterogeneous deployments consist of deployments where low power nodes are placed throughout a macro-cell layout. The interference characteristics in a heterogeneous deployment can be significantly different than in a homogeneous deployment, in downlink or uplink or both.

Examples hereof with Closed Subscriber Group (CSG) cells are given in FIG. 1, where in case (a), a macro user with no access to the CSG cell will be interfered by the Home enhanced Node B (HeNB), in case (b) a macro user causes severe interference towards the HeNB and in case (c), a CSG user is interfered by another CSG HeNB. Heterogeneous deployments, however, are not limited to those with CSG involved.

Another example is illustrated in FIG. 2, where the need for enhanced Inter-Cell Interference Coordination (ICIC) techniques for DownLink (DL) is particularly crucial when the cell assignment rule diverges from the Reference Signal Received Power (RSRP)-based approach, e.g. towards pathloss- or pathgain-based approach, sometimes also referred to as the cell range expansion when adopted for cells with a transmit power lower than neighbour cells. In FIG. 2, the cell range expansion of a pico cell is implemented by means of a parameter A. The pico cell is expanded without increasing its power, just by changing the reselection threshold, e.g., UE selects cell of pico Base Station (BS) as the serving cell when $RSRP_{pico} + \Delta \geq RSRP_{macro}$, where $RSRP_{macro}$ is the received signal strength measured for the cell of macro BS and $RSRP_{pico}$ is the signal strength measured for the cell of pico BS.

Transmit Patterns and Measurement Patterns for Enhanced ICIC (eICIC)

To facilitate measurements in the extended cell range, i.e., where high interference is expected, the standard specifies Almost Blank Subframe (ABS) patterns for eNodeBs and restricted measurement patterns for UEs. A pattern that can be configured for eICIC is a bit string indicating restricted and unrestricted subframes characterized by a length and periodicity, which are different for Frequency Division Duplex (FDD) and Time Division Duplex (TDD (40 subframes for FDD and 20, 60 or 70 subframes for TDD). Only DL patterns have been so far specified for interference coordination in 3GPP, although patterns for Uplink (UL) interference coordination are also known in prior art.

ABS pattern is a transmit pattern at a radio node transmitting radio signals; it is cell-specific and may be different from the restricted measurement patterns signaled to the UE. In a general case, ABS are low-power and/or low-transmission activity subframes. ABS patterns may be exchanged between eNodeBs via X2, but these patterns are not signalled to the UE, unlike the restricted measurement patterns.

Restricted measurement patterns (more precisely, "time domain resource restriction patterns" [TS 36.331]) are configured to indicate to the UE a subset of subframes for performing measurements, typically in lower interference conditions, where the interference may be reduced e.g. by means of configuring Multimedia Broadcast Single Frequency Network (MBSFN) subframes or ABS subframes at interfering eNodeBs.

Restricted measurement patterns may, however, be also configured for UEs with good interference conditions, i.e., receiving a measurement pattern may be not necessarily an indication of expected poor signal quality. For example, a measurement pattern may be configured for UE in the cell range expansion zone where typically high interference is expected, but a measurement pattern may also be configured for UEs located close to the serving base station where the signal quality is typically good which may be for the purpose of enabling a higher-rank transmission modes (e.g., rank-two transmissions).

Restricted measurement patterns are in general UE-specific, although it is known in prior art that such patterns may be broadcasted or multicasted. Three patterns are currently specified in the standard to enable restricted measurements:

Serving-cell pattern for Radio Link Monitoring (RLM) and Radio Resource Management (RRM) measurements, Neighbor-cell pattern for RRM measurements, Serving-cell pattern for Channel State Information (CSI) measurements.

Transmit patterns and measurement patterns are means for coordinating inter-cell interference in wireless network and improve measurement performance. Alternatively or in addition to inter-cell interference coordination techniques, measurement performance may also be improved by using more advanced receiver techniques, e.g., interference suppression or interference cancellation techniques.

UE Information about Other Cells

The UE is generally aware about the serving cell(s) configuration (see also the background on multi-carrier systems). However, the UE is not only receiving/sending data and performing measurements in the serving cell(s), it may also move for which the information about neighbour cells may be helpful for mobility decisions or the network or the network and/or the UE may also perform different radio resource management (RRM) tasks and hence measurements in neighbour cells may be needed. In LTE Rel-10, the UE may receive the aggregate neighbour cell information, e.g., an indication on whether all neighbour cells use the same MBSFN configuration as the Primary Cell (PCell).

Neighbour cells lists have been mandatory for mobility and RRM purpose in earlier networks, e.g., Universal Terrestrial Radio Access (UTRA). However, such lists (comprising e.g. neighbour cell identities) are optional in LTE, and the UE has to meet the same requirements, irrespective of whether the neighbour cell information is provided to the UE or not.

Further, the UE also receives interference from neighbour cells and the UE receiver may benefit from the knowledge about the interference character (e.g., when the interfering signal occurs and where in the frequency dimension). In LTE Rel-10, to enable eICIC, the UE may receive measurement patterns via its serving cell or PCell, as described above, for measurements in the serving cell or neighbour cells. In the latter case, only one measurement pattern is provided per frequency for multiple measurement cells, together with the list of cell identities (Physical Cell Identities (PCIs)). In Rel-11, the UE should be capable to deal with even higher interference and hence even more network assistance may be needed for the UE. For example, it has been proposed that the UE should be provided the information about the number of Cell Specific Reference signals (CRS) ports and the MBSFN configuration of at least some interfering cells.

Multi-Carrier or Carrier Aggregation Concept

To enhance peak-rates within a technology, multi-carrier or carrier aggregation solutions are known. For example, it is possible to use multiple 5 MegaHerz (MHz) carriers in High-Speed Packet Access (HSPA) to enhance the peak-rate within the HSPA network. Similarly in LTE for example multiple 20 MHz carriers or even smaller carriers (e.g. 5 MHz) can be aggregated in the UL and/or on DL. Each carrier in multi-carrier or carrier aggregation system is generally termed as a Component Carrier (CC) or sometimes is also referred to a cell. In simple words the Component Carrier (CC) means an individual carrier in a multi-carrier system. The term Carrier Aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the Primary Component Carrier (PCC) or simply primary carrier or even anchor carrier. The remaining ones are called Secondary Component Carrier (SCC) or simply secondary carriers or even supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as primary cell (PCell) or Primary Serving Cell (PSC). Similarly the secondary serving cell is interchangeably called as Secondary Cell (SCell) or Secondary Serving Cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). The inter-band CA comprising of carriers distributed over two bands is also called as Dual-Band-Dual-Carrier-HSDPA (DB-DC-HS-DPA) in HSPA or inter-band CA in LTE. Furthermore the CCs in intra-band CA may be adjacent or non-adjacent in frequency domain (aka intra-band non-adjacent CA). A hybrid CA comprising of intra-band adjacent, intra-band non-adjacent and inter-band is also possible. Using carrier aggregation between carriers of different technologies is also referred to as "multi-Radio Access Technology (RAT) carrier aggregation" or "multi-RAT-multi-carrier system" or simply "inter-RAT carrier aggregation". For example, the carriers from Wideband Code Division Multiple Access (WCDMA) and LTE may be aggregated. Another example is the aggregation of LTE and Code Division Multiple Access 2000 (CDMA2000) carriers. For the sake of clarity the carrier aggregation within the same technology as described can be regarded as 'intra-RAT' or simply 'single RAT' carrier aggregation. However, the term CA used herein may refer to any type of carrier aggregation, unless explicitly stated.

The CCs or the serving cells in CA may or may not be co-located in the same site or base station or radio network node (e.g. relay, mobile relay etc). For instance the CCs may originate (i.e. transmitted/received) at different locations (e.g. from non-located BS or from BS and Remote Radio Head (RRH) or Remote Radio Unit (RRU)). The well known examples of combined CA and multi-point communication are Distributed Antenna System (DAS), RRH, RRU, Coordinated Multi Point (CoMP), multi-point transmission/reception etc. The invention also applies to the multi-point carrier aggregation systems.

The multi-carrier operation may also be used in conjunction with multi-antenna transmission. For example signals on each CC may be transmitted by the eNB to the UE over two or more transmit and/or receive antennas.

According to Rel-11 carrier aggregation, one or more SCell can also operate on an Additional Carrier Type (ACT) which is also called as New Carrier Type (NCT). An ACT or NCT is a SCC but the cells on NCT may contain reduced number of certain type of signals in time and/or in frequency domain. For example a cell on NCT may contain Cell specific Reference Signals (CRS) only in one subframe per 5 ms. The CRS may also be reduced in the frequency domain e.g. CRS over central 25 Resource Blocks (RBs) even if cell BandWidth (BVV) is larger than 25 RBs. In a legacy carrier the CRS are transmitted in every subframe over the entire bandwidth. The SCell on NCT is therefore used for receiving data whereas important control information is mainly sent on the PCell which is transmitted on PCC. The PCC is always a normal legacy carrier i.e. contains all Rel-8 common channels and signals.

Multi-Carrier Setup or Release Procedure

A multi-carrier setup herein refers to a procedure which enables the network to at least temporarily setup or release the use of SCell, in DL and/or UL by the CA capable UE. There are two main concepts associated with the SCell setup or release and are elaborated below:
  Configuration and de-configuration of SCell(s)
  Activation and deactivation of SCell(s)

Configuration and de-configuration of SCell: The configuration procedure is used by the eNode B to configure a CA UE capable with one or more SCells (DL SCell, UL SCell or both). On the other hand, the de-configuration procedure is used by the eNode B to de-configure or remove one or more already configured SCells (DL SCell, UL SCell or both). The configuration or de-configuration procedure is also used to change the current multi-carrier configuration e.g. for increasing or decreasing the number of SCells or for swapping the existing SCells with new ones. The configuration and de-configuration are done by the eNode B using Radio Resource Control (RRC) signaling.

Activation and deactivation of secondary cells: The eNode B in LTE can activate one or more secondary cells deactivated SCells or deactivate one or more SCells on the corresponding secondary carriers. The SCells which are only configured by the eNodeB can be activated or deactivated. The PCell is always activated. The configured SCells are initially deactivated upon addition and after a handover.

The network activates and deactivates the SCell(s) by sending the Activation/Deactivation Media Access Control (MAC) control element. The Activation/Deactivation command or more specifically, "Activation/Deactivation MAC Control Element (CE)" is sent via MAC to the UE. This MAC CE is identified by a MAC Protocol Data Unit (PDU) subheader as shown below:

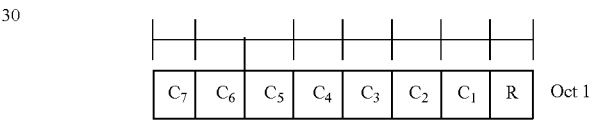

The MAC CE has a fixed size and consists of a single octet containing seven C-fields and one R-field. The Ci and R fields in the Activation/Deactivation MAC control element are defined as follows:

$C_i$: if there is an SCell configured with SCellIndex i as specified in [8], this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

Typically the deactivation is done when there is no data to transmit on the SCell(s) to enable UE battery saving. Currently both UL and DL SCells are activated and/or deactivated simultaneously upon receiving the MAC CE. But in principle the activation/deactivation can be done independently on uplink and downlink SCells.

SUMMARY

It is therefore an object of embodiments herein to provide a way of improving the handling of interference in a wireless communication system.

According to a first aspect of embodiments herein, the object is achieved by a method in a first radio node for adapting a receiver type in the first radio node. The first radio node comprises at least a first receiver type and a second receiver type. The two receiver types are different. The first radio node is comprised in a wireless communications network. The wireless communications network further comprises a second radio node and at least one third radio node. The method comprises adapting the receiver type to be one of the first type and the second type in the first radio node, for receiving first signals from the second radio node. The adapting is based on a relation between an activity of the first signals and second signals received from the at least one third radio node. The first signals comprise signals received from a first cell associated with the second radio node. The second signals comprise signals received from a second cell associated with the at least third radio node. The at least third radio node causes interference on the first signals.

According to a second aspect of embodiments herein, the object is achieved by a method in a network node for assisting a first radio node in adapting a receiver type in the first radio node for receiving signals from a second radio node. The first radio node comprises at least two receiver types. The network node, the first radio node, and the second radio node are comprised in a wireless communications network. The method comprises determining assistance data. The assistance data are for assisting the first radio node in adapting a receiver type in the first radio node for receiving first signals from the second radio node. The assistance data is related to activity of the first signals and second signals received from at least one third radio node. The first signals comprise signals received from a first cell associated with the second radio node. The second signals comprise signals received from a second cell associated with the at least third radio node. The third radio node is comprised in the wireless communications network. The at least third radio node causes interference on the first signals. The method further comprises signalling the assistance data to the first radio node.

According to a third aspect of embodiments herein, the object is achieved by a first radio node for adapting a receiver type in the first radio node. The first radio node comprises at least a first receiver type and a second receiver type. The two receiver types are different. The first radio node is adapted to be comprised in a wireless communications network. The wireless communications network further comprises a second radio node and at least one third radio node. The first radio node comprises an adapting circuit configured to adapt the receiver type to be one of the first type and the second type in the first radio node, for receiving first signals from the second radio node. The adapting circuit is configured to adapt based on a relation between an activity of the first signals and second signals received from the at least one third radio node. The first signals comprise signals received from a first cell associated with the second radio node. The second signals comprise signals received from a second cell associated with the at least third radio node. The at least third radio node causes interference on the first signals.

According to a fourth aspect of embodiments herein, the object is achieved by a network node for assisting a first radio node in adapting a receiver type in the first radio node for receiving signals from a second radio node. The first radio node comprises at least two receiver types. The network node, the first radio node, and the second radio node are adapted to be comprised in a wireless communications network. The network node comprises a determining circuit configured to determine assistance data. The assistance data are for assisting the first radio node in adapting a receiver type in the first radio node for receiving first signals from the second radio node. The assistance data is related to activity of the first signals and second signals received from at least one third radio node. The first signals comprise signals received from a first cell associated with the second radio node. The second signals comprise signals received from a second cell associated with the at least third radio node. The at least third radio node is adapted to be comprised in the wireless communications network. The at least third radio node causes interference on the first signals. The network node further comprises a signalling circuit configured to signal the assistance data to the first radio node.

By adapting the receiver type in the first radio node, based on the relation between the activity of the first signals and the second signals, an improved method to mitigate interference is provided, which does not require unnecessary processing power and/or more memory, as it enables adaptive control of the receiver responsive to aggressor interference.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
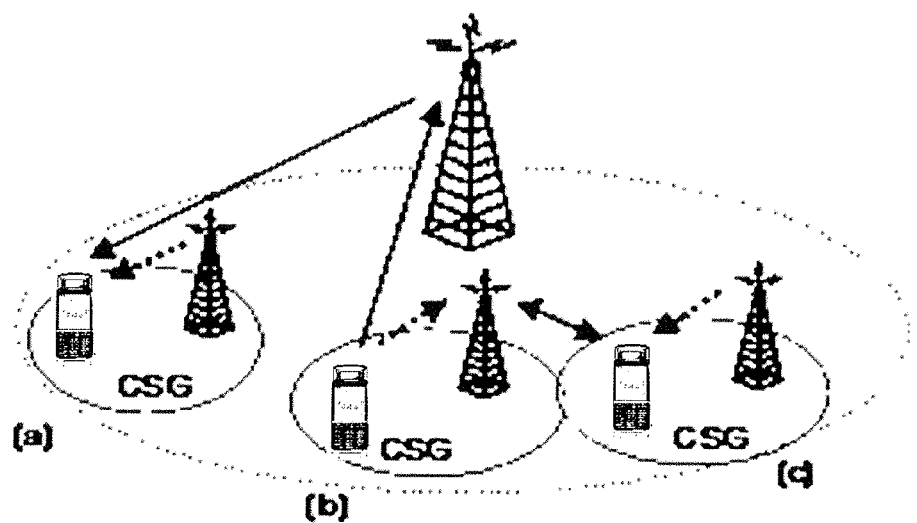
FIG. 1 illustrates various interference scenarios in heterogeneous deployments.
Figure 2:
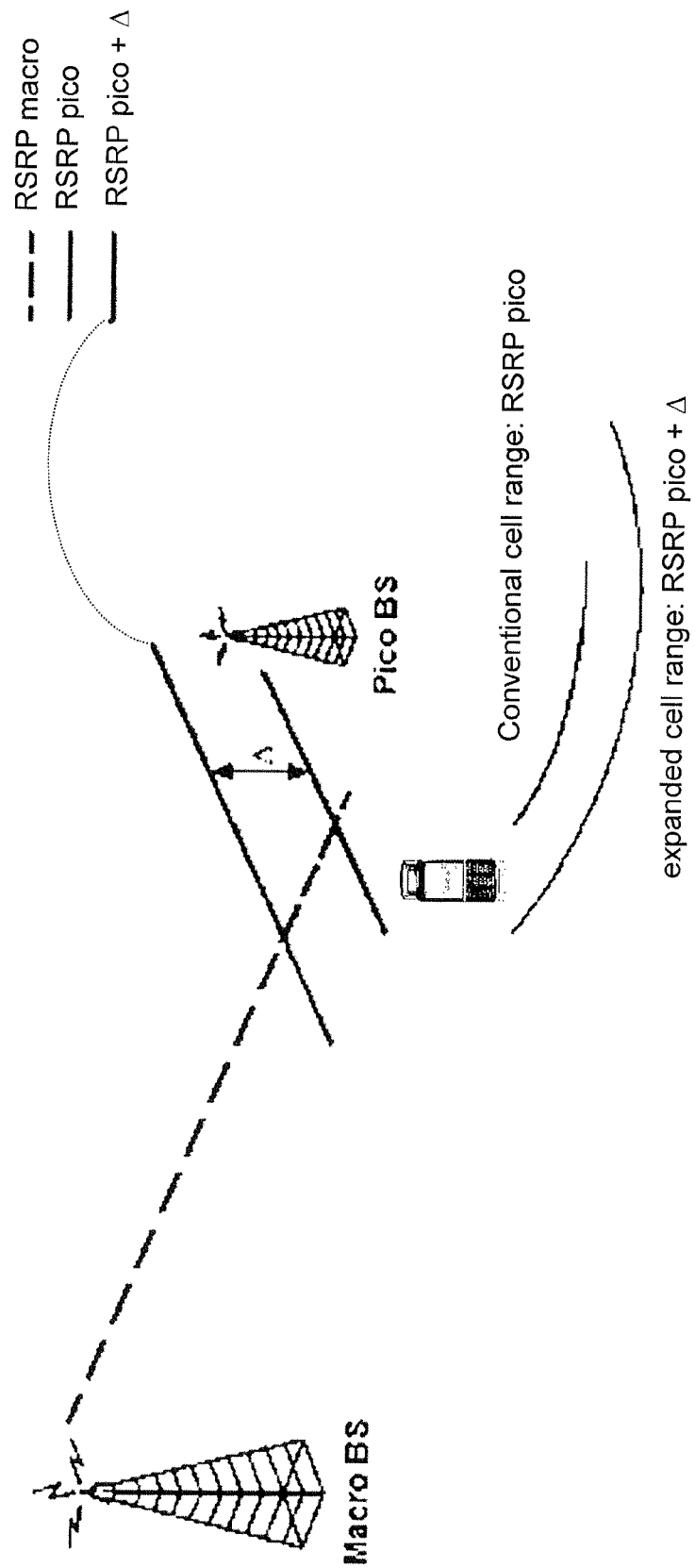
FIG. 2 illustrates cell range expansion in heterogeneous networks.

As part of the solution according to embodiments herein, one or more problems that may be associated with use of at least some of the prior art solutions will first be identified and discussed.

The term "aggressor cell" is ambiguous (not all signals are interfered by all signals) which may be misleading both for the wireless device and network nodes (e.g., the nodes involved in interference coordination, assisting the wireless device in receiving signals, configuring measurements, etc.), which will degrade the overall performance and may also require higher receiver complexity.

The prior art provides only the basic means for predicting the aggressor interference and use this information to reduce the signaling overhead, e.g., for assistance data and for handover.

Introducing new carrier types requires also new methods for predicting the aggressor interference.

The prior art does not teach about how a receiver may classify aggressor interference and adapt accordingly based on matching Details of handling the assistance data information are not taught by the prior art, since the aggressor information has not been really used in networks and the aggressor information is not the same as e.g. neighbour cell information (a neighbour may be not the aggressor and an aggressor may also be valid in a large area or multiple discontinuous areas where according to the prior art the same assistance data would normally resent every time upon entering such an area).

Embodiments will now be described more fully hereinafter with reference to the accompanying drawings, in which examples of the claimed embodiments are shown. This claimed embodiments may, however, be embodied in many different forms and should not be construed as limited to the embodiments set forth herein. Rather, these embodiments are provided so that this disclosure will be thorough and complete, and will fully convey the scope of the claimed embodiments to those skilled in the art. It should also be noted that these embodiments are not mutually exclusive. Components from one embodiment may be tacitly assumed to be present/used in another embodiment.

FIGS. 5a-d depict a wireless communications network 500 in which embodiments herein may be implemented. The wireless communications network 500 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (WiMax), or any cellular network or system.

Figure 5A:
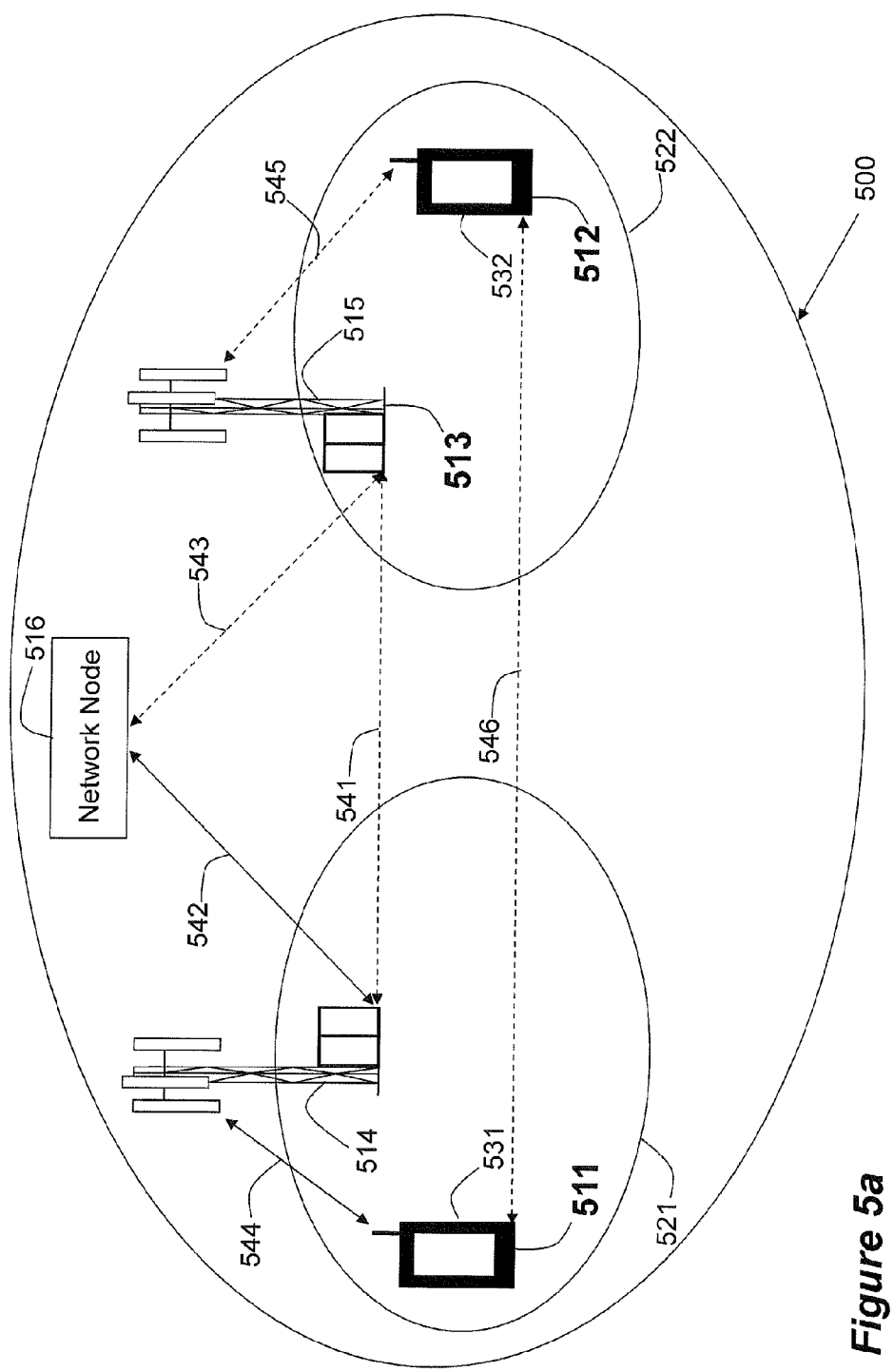
FIGS. 5a, 5b, 5c and 5d illustrate a schematic block diagram of a wireless communications network, according to some embodiments.
Figure 5B:
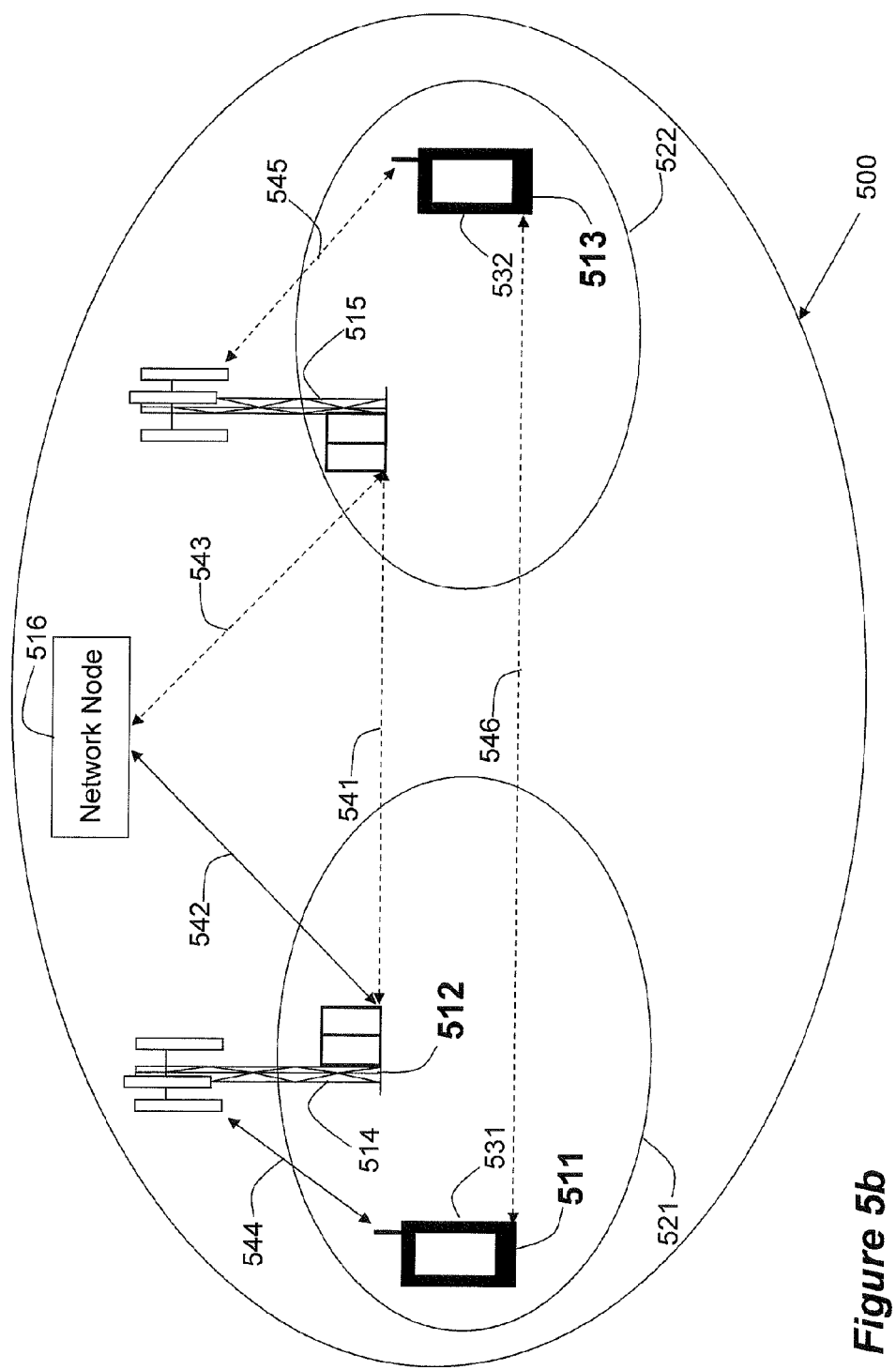
Figure 5C:
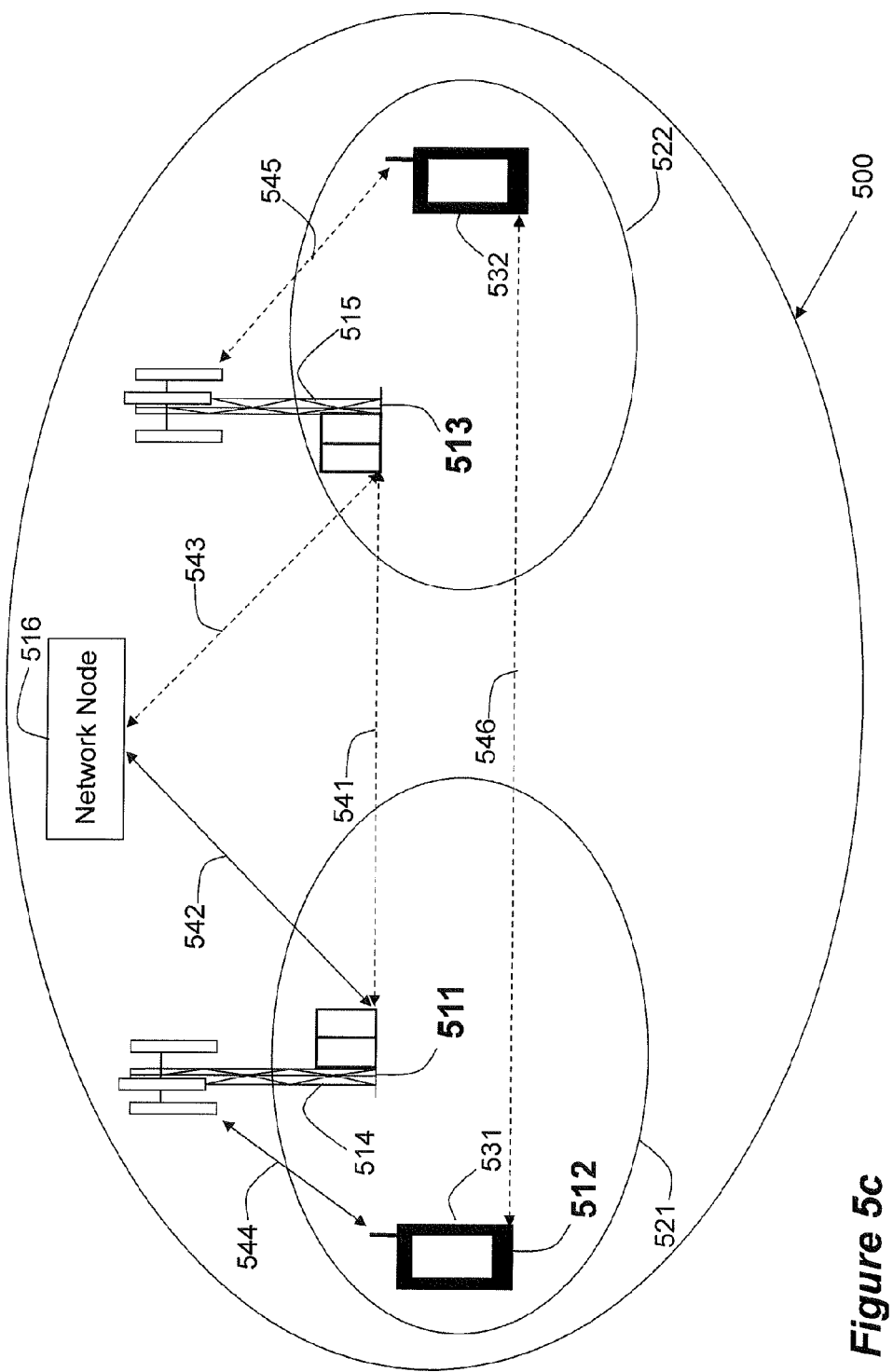
Figure 5D:
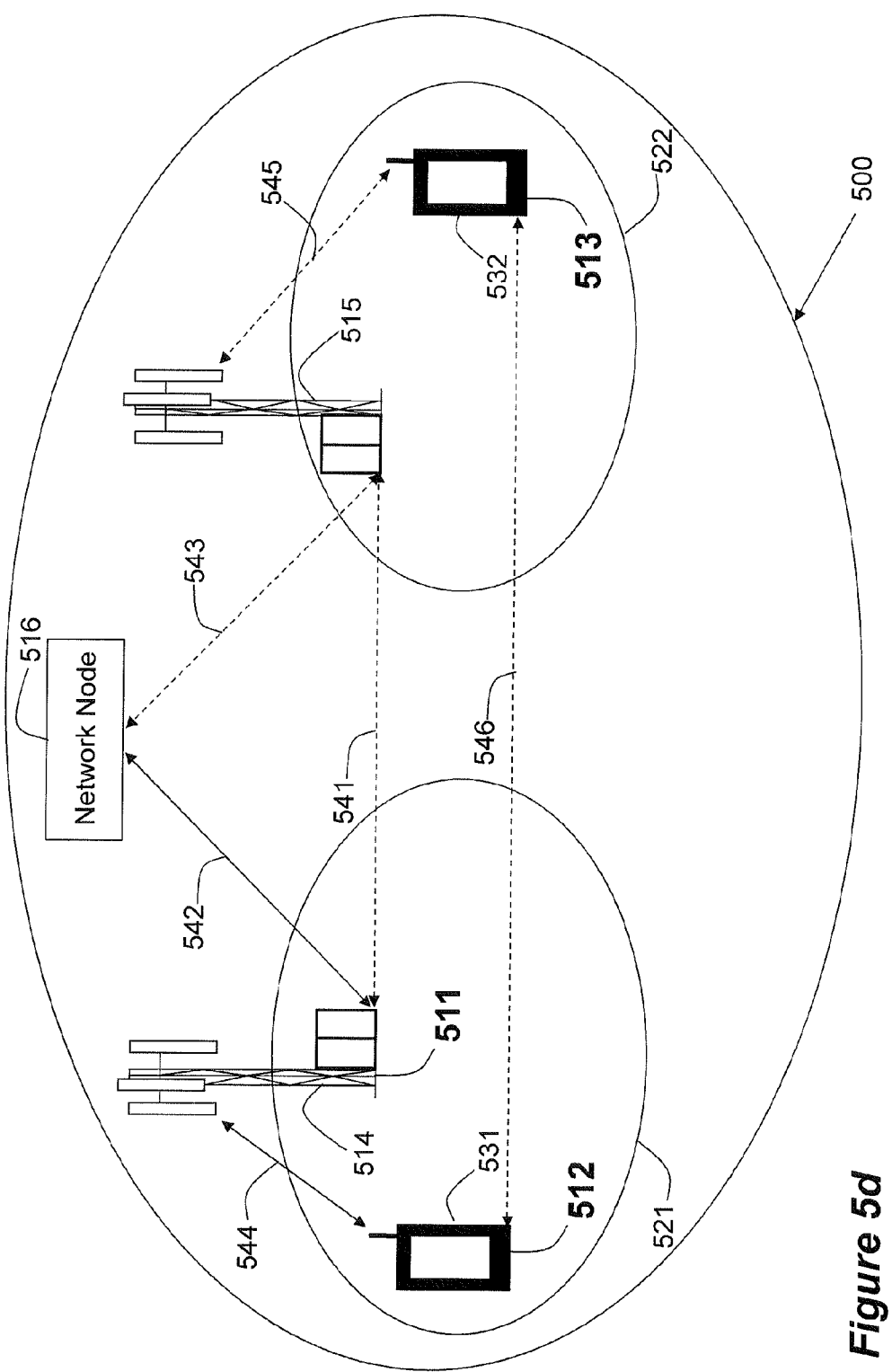

The wireless communications network 500 comprises a first radio node 511, a second radio node 512, and a third radio node 513. In the embodiment of FIG. 5a, and for illustrative purposes only, the first radio node 511 and the second radio node 512 may be wireless devices. However, in other embodiments, such as those depicted in FIGS. 5b-d, any of the first radio node 511, the second radio node 512 and the third radio node 513 may also be any of a wireless device, a radio network node, or a radio node in general, as defined below. The wireless communications network 500 comprises a first radio network node 514 and a second radio network node 515. Each of the first radio network node 514 and the second radio network node 515 may be, for example, base stations such as e.g. an eNB, eNodeB, or a Home Node B, a Home eNode B, femto Base Station, BS, pico BS or any other network unit capable to serve a device or a machine type communication device in a wireless communications network 500. In some particular embodiments, the first radio network node 514 or the second radio network node 515 may be a stationary relay node or a mobile relay node. The mixed wireless network 500 covers a geographical area which is divided into cell areas, wherein each cell area is served by a network node, although, one network node may serve one or several cells. In the examples depicted in FIG. 5a-d, the first radio network node 514 serves a first cell 521, and the second radio network node 515 serves a second cell 522. Each of the first radio network node 514 and the second radio network node 515 may be of different classes, such as e.g. macro eNodeB, home eNodeB or pico base station, based on transmission power and thereby also cell size. Typically, wireless communications network 500 may comprise more cells similar to 521 and 522, served by their respective network nodes. This is not depicted in FIGS. 5a-d for the sake of simplicity. Each of the first radio network node 514 and the second radio network node 515 may support one or several communication technologies, and its name may depend on the technology and terminology used. In 3GPP LTE network nodes, which may be referred to as eNodeBs or even eNBs, may be directly connected to one or more core networks.

In some embodiments, such as in that depicted in FIG. 5a, the third radio node 513 may be a network node 516. The network node 516 may be, for example, a "centralized network management node" or "coordinating node", which as used herein is a network node, which may also be a radio network node, which coordinates radio resources with one or more radio network nodes and/or UEs. Some examples of the coordinating node are network monitoring and configuration node, Operations Support System (OSS) node, Operations & Maintenance (O&M) node, Minimization of Drive Tests (MDT) node, Self-Organizing Network (SON) node, positioning node, a gateway node such as Packet Data Network Gateway (P-GW) or Serving Gateway (S-GW) network node or femto gateway node, a macro node coordinating smaller radio nodes associated with it, etc.

Further detailed information on network node and radio network node is provided below under the heading "Definitions and Generalizations".

The first radio network node 514 may e.g. communicate with the second radio network node 515 over a link 541 and communicate with the network node 516 over a link 542. The second radio network node 515 may communicate with the network node 516 over a link 543.

A number of wireless devices are located in the wireless communications network 500. In the example scenarios of FIGS. 5a-d, only two wireless devices are shown, first wireless device 531, and second wireless device 532. The first wireless device 531 may e.g. communicate with the first radio network node 514 over a radio link 544. The second wireless device 532 may communicate with the second radio network node 515 over a radio link 545. The first wireless device 531 may e.g. communicate with the second wireless device 532 over a radio link 546.

Each of the first wireless device 531 and second wireless device 532 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

Each of the first wireless device 531 and second wireless device 532 may further be referred to as a mobile telephone, cellular telephone, or laptop with wireless capability, just to mention some further examples. Each of the first wireless device 531 and second wireless device 532 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Further detailed information of the first radio node 511, second radio node 512, third radio node 513 and the wireless communications network 500 is provided below under the heading "Definitions and Generalizations".

Figure 6:
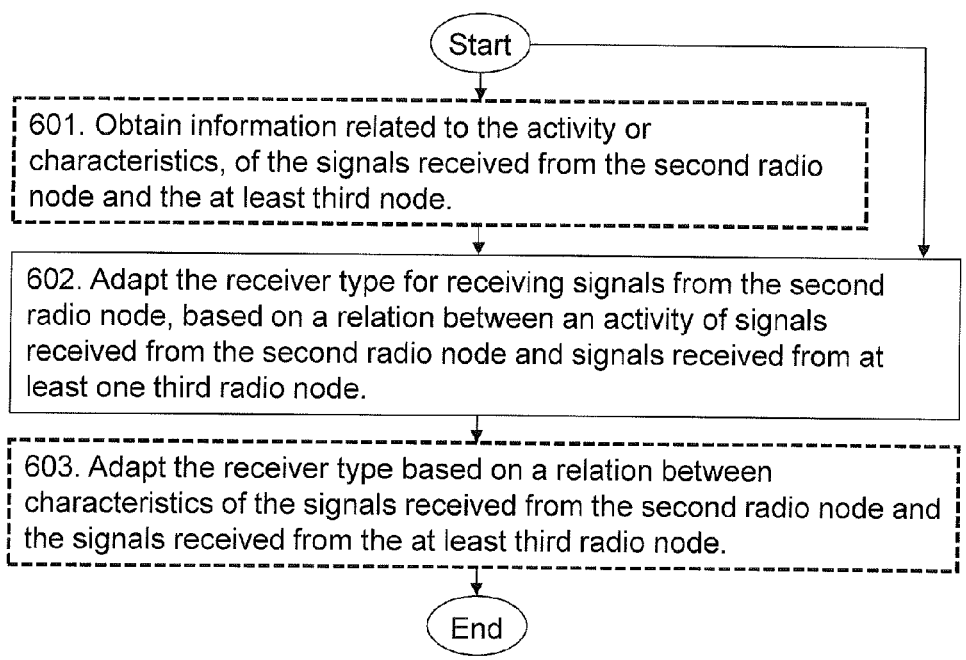
FIG. 6 is a flowchart depicting embodiments of a method in a first radio node, according to some embodiments.

Example of embodiments of a method in a first radio node 511 for adapting a receiver type in the first radio node 511, will now be described with reference to a flowchart depicted in FIG. 6. The first radio node 511 comprises at least a first receiver type and a second receiver type, the two receiver types being different. The first radio node 511 is comprised in a wireless communications network 500, the wireless communications network 500 further comprising a second radio node 512 and at least one third radio node 513.

In some embodiments, each of the receiver types is one of: a first receiver type, a second receiver type and a third receiver type. The first receiver type is not capable of mitigating interference experienced from the third radio node 513 or it is capable of mitigating the interference only if it is below a certain threshold level. The second receiver type and the third receiver type are capable of mitigating the interference received from the third radio node 513 at least for interference of a certain type. At least in some scenarios, the second receiver type is more efficient in terms of one or more of: resource consumption and interference handling performance, than the third receiver type. Further detailed information on the first, second and third receiver types is provided below under the heading "Embodiment 2: methods in the receiving/measuring node for adapting its receiver accounting for aggressor interference".

As stated earlier, any of the first radio node 511, the second radio node 512 or the third radio node 513 may be one of: the first radio network node 514, the second radio network node 515, the first wireless device 531, or the second wireless device 532.

The method comprises the following actions, which actions may be taken in any suitable order. Dashed lines of some boxes in FIG. 6 indicate that the action is not mandatory.

The method in a first radio node 511 described herein is for adapting a receiver type in the first radio node 511, for receiving first signals from the second radio node 512.

The first radio node 511 may receive the first signals from the second radio node 512, and may receive second signals from the at least one third radio node 513. The first signals may comprise signals received from a first cell associated with the second radio node 512. The second signals comprise signals received from a second cell associated with the at least third radio node 513. The at least third radio node 513 causes interference on the first signals. In some embodiments, the first signals and the second signals are of different type. For example, in some embodiments, the first signals may be cell specific reference signal (CRS) and the second signals may be PDSCH, in other embodiments, the first signals may be synchronization signals and the second signals may be reference signals.

Action 601

In this action, the first radio node 511 may obtain information related to the activity or characteristics, of the first signals and the second signals, by at least one of: autonomously, based on a pre-defined rule, based on capability of the first radio node 511, based on an indication received from another node 514, 515, 516, 531, 532, and derived based on collected statistics indicative of performance of certain signals due to high interference. This is an optional action.

In some embodiments, the obtaining information further comprises obtaining assistance data from another node 514, 515, 516, 531, 532 in the wireless communications network 500.

This action is described below in further detail, for example, under the headings and subheadings "Embodiment 1: methods for handling aggressor interference" and all its subheadings, such as "Determining a potential victim", "Determining a potential aggressor", "Determining transmitter activity", "Matching of the potential activity of signals transmitted by the transmitters of victim radio node(s) and aggressor radio node(s)", and "Recognizing a condition and extracting a matching result", and "Methods of obtaining the information related to the aggressor interference", "Combining two or more results obtained by different receiver types", and "Embodiment 3: methods for managing assistance data for assisting a receiver in handling aggressor interference" and all its subheadings, such as "Specific example of assistance data", "Composite assistance data for handling assistance interference", "Assistance data for handling aggressor interference", "Specific example of assistance data", "Composite assistance data for handling assistance interference" "Assistance data applicability", "Validity of the assistance data for handling aggressor interference", "Activation/Deactivation of the assistance data" and "Example: Activation/Deactivation of the assistance data in CA".

Action 602

In this action, the first radio node 511 adapts the receiver type to be one of the first type and the second type in the first radio node 511, for receiving first signals from the second radio node 512. That is, the first radio node 511 selects one of the receiver types for receiving first signals from the second radio node 512. The adapting 602 is based on a relation between an activity of the first signals and second signals received from the at least one third radio node 513. That is, the relation between the first and second signals in terms of their activity may comprise, for example, one or more of their transmission bandwidths, their antenna ports, their time alignment with respect to each other, etc. . . . , as elaborated further below. In some embodiments, the relation is, a relation in time, e.g., when the first signals are active and the second signals are active and whether they are active simultaneously at least at some times. As stated earlier, the first signals comprise signals received from a first cell associated with the second radio node 512, the second signals comprise signals received from a second cell associated with the at least third radio node 513. Also as stated earlier, the at least third radio node 513 causes interference on the first signals.

In some embodiments, the relation is obtained through obtaining a matching result.

In some embodiments, the relation comprises a relation between a number of transmit antenna ports used for transmitting the first signals and the second signals.

In some embodiments, the relation comprises the relation between the transmit bandwidth of the first signals and the second signals.

In some embodiments the adapting is further based on at least one of: time alignment of the first signals and the second signals, receiver activity of the first radio node 511, synchronization level or accuracy between the second radio node 512 and the third radio node 513, receiver capability related to managing the interference from the at least third radio node 513, second radio node 512 measurement quality or channel reception quality, an indication that the third radio node 513 is an aggressor critical for the first radio node 511, an indication that the second radio node 512 is a victim with respect to the third radio node 513, physical impact of the third radio node 513 on the second radio node 512, a performance impact estimate, overall impact accounting for overlap and performance impact, availability of assistance data which is valid and applicable for a candidate receiver type, absolute and/or relative received signal powers of the second radio node 512 and the third radio node 513, overlap ratio, overlap density, number of simultaneous victims, number of simultaneous aggressors, speed of the first radio node 511, when the first radio node 511 is a wireless device, receiver switching capability, capability of using one or more receivers in parallel, bandwidths, expanding measurement bandwidth, number of parallel measurements, hardware resources, currently available or unused hardware resources, battery level, activity state or activity level, target quality of a measurement or channel reception at the first radio node 511, collected receiver type statistics of resource consumption and/or performance characteristics, relation between CP lengths of the first signals and the second signals, CP length of the signals, validity of the assistance data, activation_or_deactivation status of the assistance data.

In some embodiments, the activity of the first signals and the second signals comprises at least one of: time and/or frequency resources when a transmission may occur and/or when the transmission may not occur, transmission probability, and transmission power level.

This action is described below in further detail, for example, under the headings and subheadings "Embodiment 1: methods for handling aggressor interference" and all its subheadings, such as "Performing at least one action based on the matching result", "Determining transmitter activity", "Matching of the potential activity of signals transmitted by the transmitters of victim radio node(s) and aggressor radio node(s)", and "Recognizing a condition and extracting a matching result", and "Embodiment 2: methods in the receiving/measuring node for adapting its receiver accounting for aggressor interference" and all its subheadings such as "Methods for selecting a receiver type", "Methods of adapting are described herein by examples", "Example events", and "Combining two or more results obtained by different receiver types", and "Assistance data for handling aggressor interference", "Specific example of assistance data", and "Validity of the assistance data for handling aggressor interference".

Action 603

In this action, the first radio node 511 may adapt the receiver type based on a relation between characteristics of the first signals and the second signals. Some non-limiting examples of signal characteristics are multipath delay profile, Doppler spread, signal quality, level of signal dispersion, strength of signal, relative power between the first and second signals, time and/or frequency resources when signals are transmitted, bandwidth, one or more parameters used for generating the signals (an identity number, scrambling code, phase, transmit port number, . . . ), a set of transmit antenna ports, transmit antenna configuration, transmit power, power back off, etc. . . . . This is an optional action.

This action is described below in further detail, for example, under the headings and subheadings "Recognizing a condition and extracting a matching result", and "Embodiment 2: methods in the receiving/measuring node for adapting its receiver accounting for aggressor interference" and all its subheadings, and "Specific example of assistance data".

Figure 7:
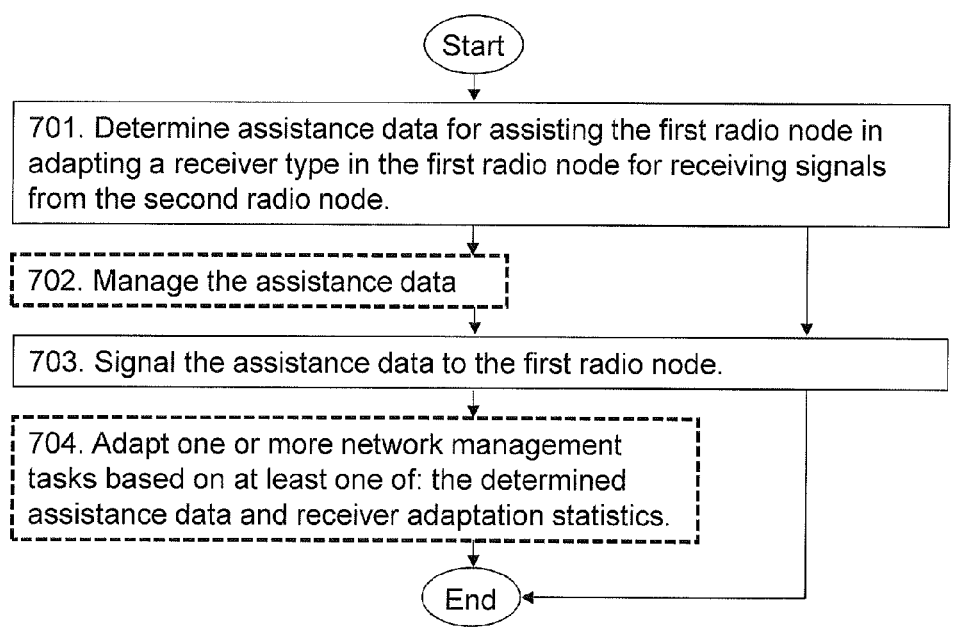
FIG. 7 is a flowchart depicting embodiments of a method in a node, according to some embodiments.

Example of embodiments of a method in a node 514, 515, 516, 531, 532 for assisting a first radio node 511 in adapting a receiver type in the first radio node 511 for receiving signals from a second radio node 512, will now be described with reference to a flowchart depicted in FIG. 7. The first radio node 511 comprises at least two receiver types. The node 514, 515, 516, 531, 532, the first radio node 511, and the second radio node 512 being comprised in a wireless communications network 500.

In some embodiments, each of the receiver types is one of: a first receiver type, a second receiver type and a third receiver type. The first receiver type is not capable of mitigating interference experienced from the third radio node 513 or it is capable of mitigating the interference only if it is below a certain threshold level. The second receiver type and the third receiver type are capable of mitigating the interference received from the third radio node 513 at least for interference of a certain type. At least in some scenarios, the second receiver type may be more efficient in terms of one or more of: resource consumption and interference handling performance, than the third receiver type. Further detailed information on the first, second and third receiver types is provided below under the heading "Embodiment 2: methods in the receiving/measuring node for adapting its receiver accounting for aggressor interference".

As stated earlier, any of the first radio node 511, the second radio node 512 or the third radio node 513 may be one of: the first radio network node 514, the second radio network node 515, the first wireless device 531, or the second wireless device 532.

The method comprises the following actions, which actions may be taken in any suitable order. Dashed lines of some boxes in FIG. 7 indicate that the action is not mandatory.

Action 701

In this action, the node 514, 515, 516, 531, 532 determines assistance data. In some embodiments, the determination may be based on obtaining information from another node which may be a UE, such as the first wireless device 531 and the second wireless device 532, or a network node, such as the first radio network node 514, the second radio network node 515 or the network node 516, and/or using stored information or historical data, wherein the information is related to activity of first and second signals. The assistance data are for assisting the first radio node 511 in adapting a receiver type in the first radio node 511 for receiving first signals from the second radio node 512. The assistance data is related to activity of the first signals and second signals received from at least one third radio node 513. The first signals comprise signals received from a first cell associated with the second radio node 512. The second signals comprise signals received from a second cell associated with the at least third radio node 513. The third radio node 513 is also comprised in the wireless communications network 500. The at least third radio node 513 causes interference on the first signals.

In some embodiments, the assistance data for assisting the first radio node 511 in adapting a receiver type in the first radio node 511 for receiving the first signals is further related to characteristics of the first signals and the second signals. As stated earlier, some non-limiting examples of signal characteristics are multipath delay profile, Doppler spread, signal quality, level of signal dispersion, strength of signal, relative power between the first and second signals, time and/or frequency resources when signals are transmitted, bandwidth, one or more parameters used for generating the signals (an identity number, scrambling code, phase, transmit port number, . . . ), a set of transmit antenna ports, transmit antenna configuration, transmit power, power back off, etc. . . . .

In some embodiments, the determining assistance data comprises determining that the third radio node 513 is an aggressor, wherein the determining 701 is based on information from the second radio node 512, information from the third radio node 513, and at least one matching result or relation between one of: activity and characteristics, of the first signals and the second signals.

In some embodiments, the assistance data comprises at least one of: time alignment of the first signals and the second signals, receiver activity of the first radio node 511, synchronization level or accuracy between the second radio node 512 and the at least third radio node 513, receiver capability related to managing the interference from the at least third radio node 513, second radio node 512 measurement quality or channel reception quality, an indication that the third radio node 513 is an aggressor critical for the first radio node 511, an indication that the second radio node 512 is a victim with respect to the third radio node 513, physical impact of the third radio node 513 on the second radio node 512, a performance impact estimate, overall impact accounting for overlap and performance impact, an identification identifying an aggressor signal, an identification identifying the aggressor transmitter, aggressor transmitter activity information, a receiver type indication for which the assistance data may apply, one or more cell identifications, a time alignment indicator with respect to a reference transmitter, relative timing of an aggressor transmitter with respect to a reference transmitter or reference time, Multicast-Broadcast Single Frequency Network, MBSFN, configuration information and transmissions in the MBSFN subframes, a logical or geographical area associated with the MBSFN configuration, and at least one of: System Information-Radio Network Temporary Identifier, SI-RNTI, Random Access-RNTI, Paging-RNTI or Cell-RNTI for receiving and decoding an aggressor interference of a specific aggressor transmission, an indicator associating a data set comprised in the assistance data with a receiver capability, an indicator associating a data set comprised in the assistance data with a receiver type, and aggressor type.

This action is described below in further detail, for example, under the headings and subheadings "Embodiment 1: methods for handling aggressor interference", and all its subheadings, such as "Determining a potential aggressor", "Matching of the potential activity of signals transmitted by the transmitters of victim radio node(s) and aggressor radio node(s)", "Recognizing a condition and extracting a matching result", and "Performing at least one action based on the matching result", and "Assistance data for handling aggressor interference", "Specific example of assistance data", "Composite assistance data for handling assistance interference".

Action 702

In this action, the node 514, 515, 516, 531, 532 may manage the assistance data. Managing may comprise at least one of: building up or updating the assistance data, deciding when the assistance data is to be provided or updated, deciding how the assistance data is to be provided, maintaining a database used for building up the assistance data, obtaining or collecting measurements and/or statistics for using when building up the assistance data, activating/deactivating assistance data, and determining a need for the configuring of signals. This is an optional action.

This action is described below in further detail, for example, under the headings and subheadings "Embodiment 3: methods for managing assistance data for assisting a receiver in handling aggressor interference" and all its subheadings.

Action 703

In this action, the node 514, 515, 516, 531, 532 signals the assistance data to the first radio node 511.

This action is described below in further detail, for example, under the subheadings "Assistance data for handling aggressor interference".

Action 704

In this action, the node 514, 515, 516, 531, 532 may adapt one or more network management tasks based on at least one of: the determined assistance data and receiver adaptation statistics. This is an optional action.

In some embodiments, the one or more network management tasks may comprise configuring the first signals and the second signals, to lower interference from the third radio node 513 towards the first radio node 511 when receiving the first signals.

In some embodiments, the one or more network management tasks may also or alternatively comprise forwarding the at least one of: the determined assistance data and receiver adaptation statistics to another node 514, 515, 516, 531, 532 in the wireless communications network 500 for network planning and configuration of parameters.

This action is described below in further detail, for example, under the headings and subheadings "Embodiment 4: method of using the matching results and/or receiver adaptation statistics for network management tasks" and all its subheadings, and in "Performing at least one action based on the matching result".

Figure 8:
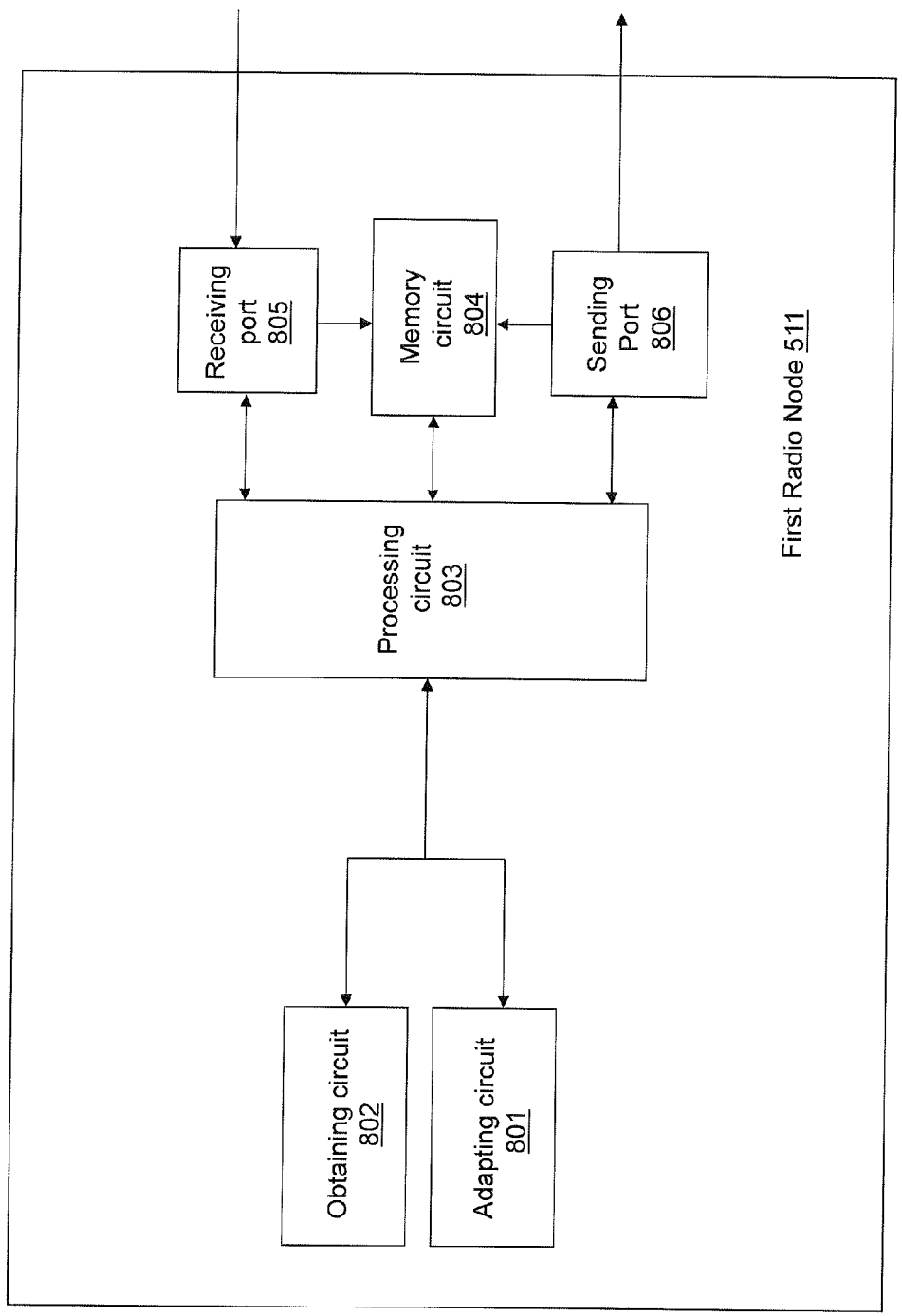
FIG. 8 is a block diagram of a first radio node that is configured according to some embodiments.

To perform the method actions in the first radio node 511 described above in relation to FIG. 6 for adapting a receiver type in the first radio node 511, the first radio node 511 comprises the following arrangement depicted in FIG. 8. The first radio node 511 comprises at least a first receiver type and a second receiver type, the two receiver types being different. The first radio node 511 is adapted to be comprised in a wireless communications network 500. The wireless communications network 500 further comprises a second radio node 512 and at least one third radio node 513.

The detailed description of some of the following corresponds to the same references provided above, in relation to the actions described for the first node 511, and will thus not be repeated here. For example, further detailed information on the first, second and third receiver types is provided below under the heading "Embodiment 2: methods in the receiving/measuring node for adapting its receiver accounting for aggressor interference".

In some embodiments, each of the receiver types is one of: a first receiver type, a second receiver type and a third receiver type. The first receiver type is not capable of mitigating interference experienced from the third radio node 513 or it is capable of mitigating the interference only if it is below a certain threshold level. The second receiver type and the third receiver type are capable of mitigating the interference received from the third radio node 513 at least for interference of a certain type. At least in some scenarios, the second receiver type is more efficient in terms of one or more of: resource consumption and interference handling performance, than the third receiver type.

As stated earlier, any of the first radio node 511, the second radio node 512 or the third radio node 513 may be one of: the first radio network node 514, the second radio network node 515, the first wireless device 531, or the second wireless device 532.

The first radio node 511 comprises a adapting circuit 801 configured to adapt the receiver type to be one of the first type and the second type in the first radio node 511, for receiving first signals from the second radio node 512. The adapting circuit 801 is configured to adapt based on a relation between an activity of the first signals and second signals received from the at least one third radio node 513. The first signals comprise signals received from a first cell associated with the second radio node 512. The second signals comprise signals received from a second cell associated with the at least third radio node 513. The at least third radio node 513 causes interference on the first signals.

In some embodiments, the relation is configured to be obtained through obtaining a matching result.

In some embodiments, the relation comprises a relation between a number of transmit antenna ports used for transmitting the first signals and the second signals.

In some embodiments, the relation comprises the relation between the transmit bandwidth of the first signals and the second signals.

In some embodiments, the first signals and the second signals are of different type.

In some embodiments, the adapting circuit 801 is further configured to adapt the receiver type based on a relation between characteristics of the first signals and the second signals.

In some embodiments, the activity of the first signals and the second signals comprises at least one of: time and/or frequency resources when a transmission may occur and/or when the transmission may not occur, transmission probability, and transmission power level.

In some embodiments, the adapting circuit 801 is further configured to adapt based on at least one of: time alignment of the first signals and the second signals, receiver activity of the first radio node 511, synchronization level or accuracy between the second radio node 512 and the third radio node 513, receiver capability related to managing the interference from the at least third radio node 513, second radio node 512 measurement quality or channel reception quality, an indication that the third radio node 513 is an aggressor critical for the first radio node 511, an indication that the second radio node 512 is a victim with respect to the third radio node 513, physical impact of the third radio node 513 on the second radio node 512, a performance impact estimate, overall impact accounting for overlap and performance impact, availability of assistance data which is valid and applicable for a candidate receiver type, absolute and/or relative received signal powers of the second radio node 512 and the third radio node 513, overlap ratio, overlap density, number of simultaneous victims, number of simultaneous aggressors, speed of the first radio node 511, when the first radio node 511 is a wireless device 531, 532, receiver switching capability, capability of using one or more receivers in parallel, bandwidths, expanding measurement bandwidth, number of parallel measurements, hardware resources, currently available or unused hardware resources, battery level, activity state or activity level, target quality of a measurement or channel reception at the first radio node 511, collected receiver type statistics of resource consumption and/or performance characteristics, relation between CP lengths of the first signals and the second signals, CP length of the signals, validity of the assistance data, and activation_or_deactivation status of the assistance data.

In some embodiments, the first radio node 511 also comprises an obtaining circuit 802 configured to obtain information related to the activity or characteristics, of the first signals and the second signals, by at least one of: autonomously, based on a pre-defined rule, based on capability of the first radio node 511, based on an indication received from another node 514, 515, 516, 531, 532, derived based on collected statistics indicative of performance of certain signals due to high interference.

In some embodiments, the obtaining circuit 802 is further configured to obtain assistance data from another node 514, 515, 516, 531, 532 in the wireless communications network 500.

Figure 9:
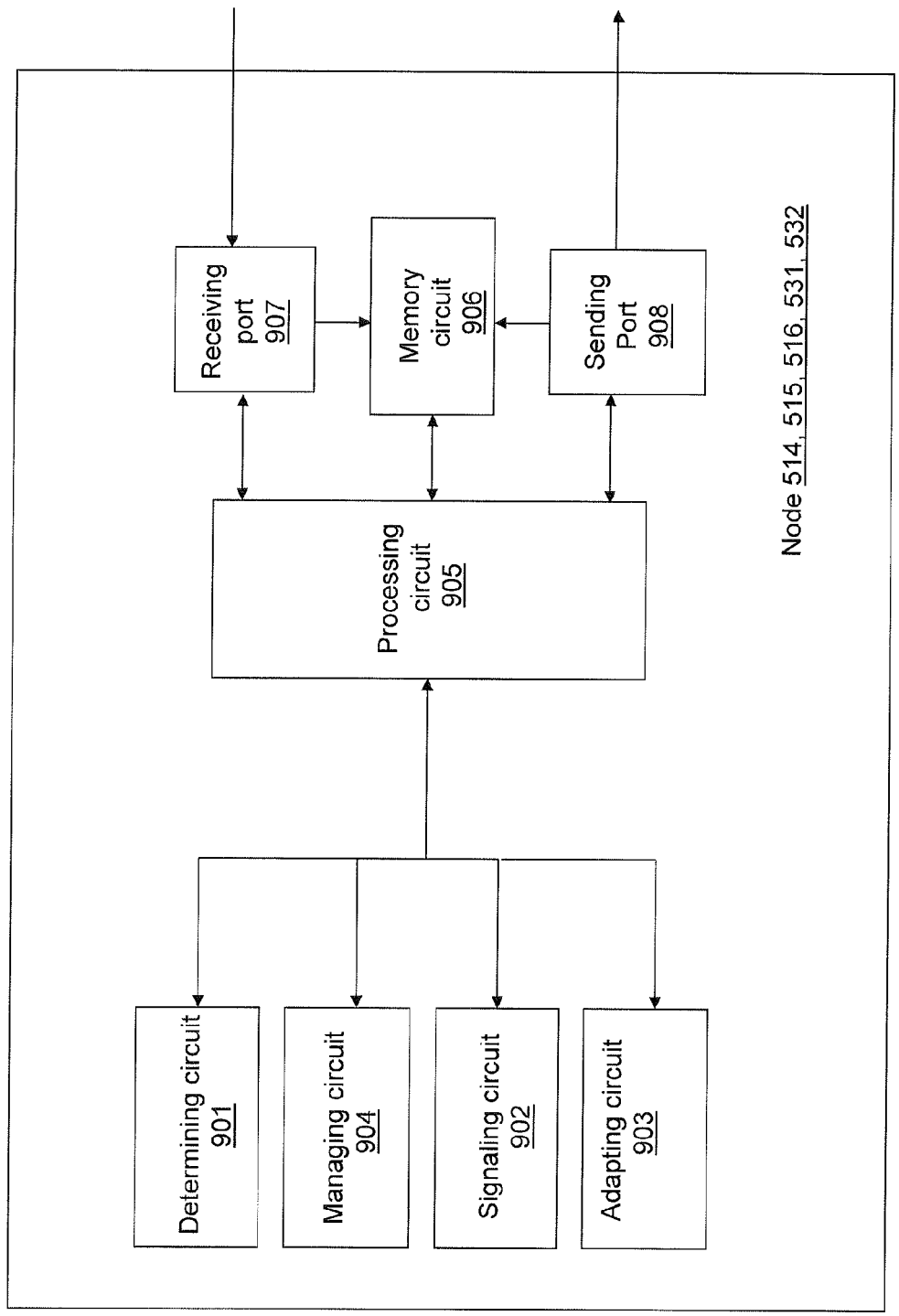
FIG. 9 is a block diagram of a node that is configured according to some embodiments.

The embodiments herein for adapting a receiver type in the first radio node 511 may be implemented through one or more processors, such as a processing circuit 803 in the first radio node 511 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first radio node 511. One such carrier may be in the form of a CD ROM disc. It may be however feasible with other data carriers such as a memory stick. The computer program code may furthermore be provided as pure program code on a server and downloaded to the first radio node 511.

The first radio node 511 may further comprise a memory circuit 804 comprising one or more memory units. The memory circuit 804 may be arranged to be used to store data such as, the information obtained or adapted by the processing circuit 803 in relation to applications to perform the methods herein when being executed in the first radio node 511. Memory circuit 804 may be in communication with the processing circuit 803. Any of the other information processed by the processing circuit 803 may also be stored in the memory circuit 804.

In some embodiments, information such as information from the second or third radio nodes 512, 513, or from the network node 516 may be received through a receiving port 805. In some embodiments, the receiving port 805 may be, for example, connected to the one or more antennas in the first radio node 511. In other embodiments, the first radio node 511 may receive information from another structure in the wireless communications network 500 through the receiving port 805. Since the receiving port 805 may be in communication with the processing circuit 803, the receiving port 805 may then send the received information to the processing circuit 803. The receiving port 805 may also be configured to receive other information.

The information obtained or adapted by the processing circuit 803 in relation to the method disclosed herein, may be stored in the memory circuit 804 which, as stated earlier, may be in communication with the processing circuit 803 and the receiving port 805.

The processing circuit 803 may be further configured to signal information, to another node in the wireless communications network 500, through a sending port 806, which may be in communication with the processing circuit 803, and the memory circuit 804.

Those skilled in the art will also appreciate that the obtaining circuit 802 and the adapting circuit 801 described above may refer to a combination of analog and digital circuits, and/or one or more processors configured with software and/or firmware (e.g., stored in memory) that, when executed by the one or more processors such as the processing circuit 803, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in node 514, 515, 516, 531, 532 described above in relation to FIG. 7 for assisting a first radio node 511 in adapting a receiver type in the first radio node 511 for receiving signals from a second radio node 512, the node 514, 515, 516, 531, 532 comprises the following arrangement depicted in FIG. 9. The node 514, 515, 516, 531, 532, the first radio node 511, and the second radio node 512 are adapted to be comprised in a wireless communications network 500. The first radio node 511 comprises at least two receiver types.

The detailed description of some of the following corresponds to the same references provided above, in relation to the actions described for the node 514, 515, 516, 531, 532, and will thus not be repeated here. For example, further detailed information on the first, second and third receiver types is provided below under the heading "Embodiment 2: methods in the receiving/measuring node for adapting its receiver accounting for aggressor interference".

In some embodiments, each of the receiver types is one of: a first receiver type, a second receiver type and a third receiver type. The first receiver type is not capable of mitigating interference experienced from the third radio node 513 or it is capable of mitigating the interference only if it is below a certain threshold level. The second receiver type and the third receiver type are capable of mitigating the interference received from the third radio node 513 at least for interference of a certain type. At least in some scenarios, the second receiver type is more efficient in terms of one or more of: resource consumption and interference handling performance, than the third receiver type.

As stated earlier, any of the first radio node 511, the second radio node 512 or the third radio node 513 may be one of: the first radio network node 514, the second radio network node 515, the first wireless device 531, or the second wireless device 532.

The node 514, 515, 516, 531, 532 comprises a determining circuit 901 configured to determine assistance data. The assistance data are for assisting the first radio node 511 in adapting a receiver type in the first radio node 511 for receiving first signals from the second radio node 512. The assistance data is related to activity of the first signals and second signals received from at least one third radio node 513. The first signals comprise signals received from a first cell associated with the second radio node 512. The second signals comprise signals received from a second cell associated with the at least third radio node 513. The at least third radio node 513 is adapted to be comprised in the wireless communications network 500. The at least third radio node 513 causes interference on the first signals.

In some embodiments, the assistance data for assisting the first radio node 511 in adapting a receiver type in the first radio node 511 for receiving the first signals is further related to characteristics of the first signals and the second signals.

In some embodiments, the determining circuit 901 is further configured to determine that the third radio node 513 is an aggressor, based on information from the second radio node 512, information from the third radio node 513, and at least one matching result or relation between one of: activity and characteristics, of the first signals and the second signals.

In some embodiments, the assistance data comprises at least one of: time alignment of the first signals and the second signals, receiver activity of the first radio node 511, synchronization level or accuracy between the second radio node 512 and the at least third radio node 513, receiver capability related to managing the interference from the at least third radio node 513, second radio node 512 measurement quality or channel reception quality, an indication that the third radio node 513 is an aggressor critical for the first radio node 511, an indication that the second radio node 512 is a victim with respect to the third radio node 513, physical impact of the third radio node 513 on the second radio node 512, a performance impact estimate, overall impact accounting for overlap and performance impact, an identification identifying an aggressor signal, an identification identifying the aggressor transmitter, aggressor transmitter activity information, a receiver type indication for which the assistance data may apply, one or more of cell identifications, a time alignment indicator with respect to a reference transmitter, relative timing of an aggressor transmitter with respect to a reference transmitter or reference time, Multicast-Broadcast Single Frequency Network, MBSFN, configuration information and transmissions in the MBSFN subframes, a logical or geographical area associated with the MBSFN configuration, and at least one of: System Information-Radio Network Temporary Identifier, SI-RNTI, Random Access-RNTI, Paging-RNTI or Cell-RNTI for receiving and decoding an aggressor interference of a specific aggressor transmission, an indicator associating a data set comprised in the assistance data with a receiver capability, an indicator associating a data set comprised in the assistance data with a receiver type, and aggressor type.

The node 514, 515, 516, 531, 532 comprises a signalling circuit 902 configured to signal the assistance data to the first radio node 511.

In some embodiments, the node 514, 515, 516, 531, 532 also comprises an adapting circuit 903 configured to adapt one or more network management tasks based on at least one of: the determined assistance data and receiver adaptation statistics.

In some embodiments, the one or more network management tasks comprise configuring one of: the first signals and the second signals, to lower interference from the third radio node 513 towards the first radio node 511 when receiving the first signals.

In some embodiments, the one or more network management tasks comprise additionally or alternatively forwarding the at least one of: the determined assistance data and receiver adaptation statistics to another node 514, 515, 516, 531, 532 in the wireless communications network 500 for network planning and configuration of parameters.

In some embodiments, the node 514, 515, 516, 531, 532 also comprises a managing circuit 904 configured to manage the assistance data, wherein to manage comprises being configured to at least one of: build up or update the assistance data, decide when the assistance data is to be provided or updated, decide how the assistance data is to be provided, maintain a database used for building up the assistance data, obtain or collect measurements and/or statistics for using when building up the assistance data, activate/deactivate assistance data, and determine a need for the configuring of signals.

The embodiments herein for assisting a first radio node 511 in adapting a receiver type in the first radio node 511 for receiving signals from a second radio node 512 may be implemented through one or more processors, such as a processing circuit 905 in the node 514, 515, 516, 531, 532 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the node 514, 515, 516, 531, 532. One such carrier may be in the form of a CD ROM disc. It may be however feasible with other data carriers such as a memory stick. The computer program code may furthermore be provided as pure program code on a server and downloaded to the node 514, 515, 516, 531, 532.

The node 514, 515, 516, 531, 532 may further comprise a memory circuit 906 comprising one or more memory units. The memory circuit 906 may be arranged to be used to store data such as, the information received by the processing circuit 905 in relation to applications to perform the methods herein when being executed in the node 514, 515, 516, 531, 532. Memory circuit 906 may be in communication with the processing circuit 905. Any of the other information processed by the processing circuit 905 may also be stored in the memory circuit 906.

In some embodiments, information from the first, second or third radio nodes 511, 512, 513 may be received through a receiving port 907. In some embodiments, the receiving port 907 may be, for example, connected to the one or more antennas in the node 514, 515, 516, 531, 532. In other embodiments, the node 514, 515, 516, 531, 532 may receive information from another structure in the wireless communications network 500 through the receiving port 907. Since the receiving port 907 may be in communication with the processing circuit 905, the receiving port 907 may then send the received information to the processing circuit 905. The receiving port 907 may also be configured to receive other information.

The information received by the processing circuit 905 in relation to methods herein, may be stored in the memory circuit 906 which, as stated earlier, may be in communication with the processing circuit 905 and the receiving port 907.

The processing circuit 905 may be further configured to send or signal information to the first radio node 511, the second radio node 512 or to the third node 513, through a sending port 908, which may be in communication with the processing circuit 905, and the memory circuit 906.

Those skilled in the art will also appreciate that the determining circuit 901, the managing circuit 904, signalling circuit 902 and the adapting circuit 903 described above may refer to a combination of analog and digital circuits, and/or one or more processors configured with software and/or firmware (e.g., stored in memory) that, when executed by the one or more processors such as the processing circuit 905, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

DEFINITIONS AND GENERALIZATIONS

Definitions explained in sections below may apply to any embodiment described in the current specification, including the Detailed Description herein, as well as in the associated Claims, Figures and Summary sections.

A wireless device, such as the first wireless device 531 and the second wireless device 532, and UE are used interchangeably in the description. Any reference to a wireless device (or UE) herein, is to be understood to apply to any of the first wireless device 531 and the second wireless device 532. A UE may comprise any device equipped with a radio interface and capable of at least generating and transmitting a radio signal to a radio network node, such as the first radio network node 514, the second radio network node 515. Note that even some radio network nodes, such as the first radio network node 514, the second radio network node 515, e.g., femto BS (aka home BS), may also be equipped with a UE-like interface. Some example of "UE" that are to be understood in a general sense are Personal Digital Assistant (PDA), laptop, mobile, sensor, fixed relay, mobile relay, any radio network node equipped with a UE-like interface (e.g., small Radio Base Station (RBS), eNodeB, femto BS).

A radio node, such as the first radio node 511, the second radio node 512 and the third radio node 513, is characterized by its ability to transmit and/or receive radio signals and it comprises at least a transmitting or receiving antenna. A radio node may be a UE or a radio network node, such as the first radio network node 514, the second radio network node 515. Some examples of radio nodes are a radio base station (e.g., eNodeB in LTE or NodeB in Universal Terrestrial Radio Access Network (UTRAN)), a relay, a mobile relay, remote radio unit (RRU), remote radio head (RRH), a sensor, a beacon device, a measurement unit (e.g., Location Measurement Units (LMUs) measuring UL signals), user terminal, PDA, mobile, iPhone, laptop, etc. The radio node may also be capable to perform channel estimation and/or measurements on the received signal or demodulation of the received signal. Any reference to a radio node herein, is to be understood to apply to any of the first wireless device 531, the second wireless device 532, the first radio network node 514 and the second radio network node 515, unless otherwise noted.

A radio network node, such as the first radio network node 514, and the second radio network node 515, is a radio node comprised in a radio communications network, such as wireless communications network 500, and typically characterized by own or associated network address. For example, a mobile equipment, such as the first wireless device 531 and the second wireless device 532, in a cellular network, such as wireless communications network 500, may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A). A radio network node, including eNodeB, RRH, RRU, or transmitting-only/receiving-only nodes, may or may not create own cell, such as the first cell 521 and the second cell 522. It may also share a cell with another radio node which creates own cell, or it may operate in a cell sector. More than one cell or cell sectors (commonly named in the described embodiments by a generalized term "cell" which may be understood as a cell or its logical or geographical part) may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell associated with a transmit node, and it may or may not share the same cell IDentifier (ID) with another transmit node. Any reference to a cell herein, is to be understood to apply to any of the first cell 521 and the second cell 522, unless otherwise noted. Also, any reference to a radio network node herein, is to be understood to apply to any of the first radio network node 514 and the second radio network node 515.

Receiving/measuring radio node, such as the first radio node 511, is a radio node receiving a radio signal and/or performing measurements on a radio signal. Any reference to a receiving or measuring radio node herein, or receiver node, receiver network node is to be understood to apply to the first radio node 511. Some examples: a wireless device receiving DL radio signals or eNodeB receiving radio signals in UL. The measurements and signal/channel receptions may also be performed at specific time occasions, which may also be indicated by a pattern, e.g., restricted measurement pattern indicating subframes for DL measurements for a UE in a heterogeneous deployment. A pattern describing measurement/receive occasions may or may not be provided to/obtained by the receiving/measuring node; the pattern may also be pre-defined by a rule (e.g., a standard).

A victim (aka target) may comprise a signal, such as each one of the first signals, or a channel being received or a specific time- and/or frequency resource (which may potentially be used for radio communication) that are subject or may be subject to interference and noise generated by other sources. In some embodiments, the term "victim" may also refer to an entity, such as the second radio node 512, associated with the signal(s) or channel(s) being received or measured that are subject or may be subject to interference and noise generated by other sources. Any reference herein to a target or measured radio node, target node, target measured node, measured node, or victim node, is to be understood to apply to the second radio node 512. Any reference herein to a victim or a victim signal is to be understood to apply to any of the each of the first signals. A victim signal/channel may be a downlink or an uplink signal/channel or any signal/channel between two radio nodes, including device-to-device communication. Some examples of such entities are a cell or a transmitter whose received signal or channel quality suffers or may suffer from the interference and noise. Some examples of victim signals and channels: physical signals (e.g., reference signals, CRS, Positioning Reference Signals (PRS), DeModulation Reference Signal (DM-RS), synchronization signals, Primary Synchronization Signal (PSS), Secondary Synchronization Sequence (SSS), satellite or radar signals, broadcast signals, SRS), physical channels (broadcast or multicast channel, Physical Broadcast CHannel. (PBCH), control channel, Physical Downlink Control CHannel (PDCCH), Physical Control Format Indicator CHannel (PCFICH), Physical Hybrid Automatic Repeat reQuest Indicator CHannel (PHICH), Physical Uplink Control CHannel (PUCCH), data channel, Physical Downlink Shared CHannel (PDSCH), Physical Uplink Shared CHannel (PUSCH)), logical channels (system information, paging). The signals may be DL signals or UL signals or satellite or peer-to-peer communication signals (e.g., device-to-device).

A target/measured radio node, such as the second radio node 512, e.g., a wireless device or a radio network node, is a radio node whose transmissions are being received or measured by the receiving/measuring radio node. Any reference to a target or measured radio node, target node, target measured node, measured node, or victim node herein, is to be understood to apply to the second radio node 512. The transmissions of the aggressor may also be at specific time occasions or may be configured differently at different time occasions, e.g., following a transmit pattern. A pattern describing the measured signal transmissions may or may not be provided to/obtained by the receiving/measuring node; the pattern may also be pre-defined by a rule (e.g., a standard). Any reference to a measured cell, target measured cell herein, is to be understood to apply to the corresponding cell of the second radio node 512.

An aggressor is a source of the interference or noise that impact the victim. An aggressor may be a radio transmission (e.g., a signal or a channel), such as each of the second signals, or an entity associated with the aggressor transmission (e.g., a cell or any transmitting radio node). An aggressor signal/channel may be a downlink or an uplink signal/channel or any signal/channel between two radio nodes, including device-to-device communication. Some examples of victim signals and channels: physical signals (e.g., reference signals, CRS, PRS, DM-RS, synchronization signals, PSS, SSS, satellite or radar signals, broadcast signals, SRS), physical channels (broadcast or multicast channel, PBCH, control channel, PDCCH, PCFICH, PHICH, PUCCH, data channel, PDSCH, PUSCH), logical channels (system information, paging). The signals may be DL signals or UL signals or satellite or peer-to-peer communication signals (e.g., device-to-device). Any reference herein to an aggressor or aggressor signal is to be understood to apply to any of the each of the second signals.

An aggressor radio node, such as the third radio node 513, e.g., another wireless device transmitting in UL or radio network node transmitting in DL, is a radio node transmitting signals interfering to the signals being received and/or measured by the receiving/measuring radio node. Any reference to an aggressor radio node, aggressor node, interfering node herein, is to be understood to apply to the third radio node 513. "Aggressor cell" (which may be DL or UL) is used in some embodiments to refer to transmissions of the aggressor radio node, e.g., a UE in a neighbor cell may be an aggressor to a receiving/measuring UE or an eNodeB may be an aggressor radio node to transmissions of the UE's serving radio node. Any reference to an aggressor cell, interfering cell herein, is to be understood to apply to the corresponding cell of the third radio node 513. The transmissions of the aggressor may also be at specific time occasions or may be configured differently at different time occasions, e.g., following a transmit pattern which may be configured in heterogeneous deployments in an aggressor cell. A pattern describing aggressor's transmit activity or inactivity may or may not be provided to/obtained by the receiving/measuring node; the pattern may also be predefined by a rule (e.g., a standard).

Some examples of victim-aggressor relations: a satellite signal to a satellite signal, an LTE physical signal to an LTE physical signal (of the same or different type) or to an LTE physical channel, an LTE physical channel to an LTE physical channel (of the same or different type) or an LTE physical signal, etc.

A network node may be any radio network node, such as the first radio network node 514, the second radio network node 515, or core network node, such as network node 516. Some non-limiting examples of a network node are an eNodeB, Radio Network Controller (RNC), positioning node, Mobility Management Entity (MME), Public Safety Answering Point (PSAP), Self-Optimized Network (SON)

node, Minimization of Drive Tests (MDT) node, (typically but not necessarily) coordinating node, and Operation and Maintenance (O&M) node.

A network node or a UE are commonly referred to as a node.

Positioning node, such as the first radio network node 514, the second radio network node 515, the network node 516, the first wireless device 531 and the second wireless device 532, described in different embodiments is a node with positioning functionality. For example, for LTE it may be understood as a positioning platform in the user plane (e.g., Service Location Protocol (SLP) in LTE) or a positioning node in the control plane (e.g., Evolved Serving Mobile Location Centre (E-SMLC) in LTE). SLP may also consist of Secure user plane Location Centre (SLC) and Secure user plane Location Positioning Centre (SPC), where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node", such as the first radio network node 514, the second radio network node 515, and the network node 516, used herein is a network and/or node, which coordinates radio resources with one or more radio nodes. Some examples of the coordinating node are network monitoring and configuration node, Operations Support System (OSS) node, Operation and Maintenance (O&M), Minimization of Drive Tests (MDT) node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein is either via direct links or logical links (e.g. via higher layer protocols and/or via one or more network and/or radio nodes). For example, signaling from a coordinating node may pass another network node, e.g., a radio network node.

The described embodiments are not limited to LTE, but may apply with any Radio Access Network (RAN), single- or multi-RAT. Some other RAT examples are LTE-Advanced, UMTS, HSPA, Global System for Mobile communications (GSM), cdma2000, WiMAX, and WiFi.

"Receiver type" is used interchangeably with "receiver technique".

The term "subframe" used in the embodiments described herein is an example resource in the time domain, and in general it may be any pre-defined time instance or time period.

The term "signal" used in the embodiments described herein may refer to physical signals (e.g., reference signals, cell-specific reference signals, user-specific reference signals, positioning reference signals, MBSFN reference signals, e.g., CRS or PRS, DM-RS or SRS, or synchronization signals, e.g., PSS or SSS), physical broadcast signals or channels (e.g., PBCH), or physical control or data channels (e.g., PDCCH, PCFICH, PHICH, PDSCH, PUCH, PUSCH, etc.) some of which may be used also for broadcast/multicast transmissions (e.g., paging or system information may be transmitted over PDSCH). Signals such as those described herein may be used, for example, by the node 514, 515, 516, 531, 532 to signal the assistance data to the first radio node 511. Signalling may comprise physical layer signalling, e.g. via control channels or signals, and/or higher-layer signalling, e.g., L2 protocols such as RRC or LPP.

We have to cover both options.

The embodiments described herein may be independent embodiments or any embodiment may be combined in any combination with at least one other embodiment (or applied together) fully or in part.

Embodiment 1

Methods for Handling Aggressor Interference

Embodiments described in this section may be combined, at least in part, with embodiments described in other sections.

At a high level, handling the aggressor interference may comprise steps of:
1. Determining at least one potential victim (e.g., signal or node or cell)
2. Determining at least one potential aggressor (e.g., signal or node or cell)
3. Determining the transmit activity of the at least one potential victim
4. Determining the transmit activity of the at least one potential aggressor
5. [Optional] Determining receiver activity of the receiving/measuring radio node
6. Match the activity of the at least one potential victim and the activity of the at least one potential aggressor; and
7. Perform at least one action based on the matching result However, there may be not necessary to always perform matching when an aggressor interference scenario occurs. In some cases it may be possible to store the result or use a pre-defined matching result or predict the matching result based on another matching result. Said another matching result may be a matching result for another aggressor signal, for another victim signal, or for a similar but not exactly the same condition (e.g., a different time shift between victim and aggressor transmissions; for example, the transmitters are not synchronized but time-shifted by one radio frame which means colliding results for many signals are still the same except e.g. System Information Block 1 (SIB1) transmissions which do not occur in every radio frame).

Hence, in another example, the process of handling the aggressor interference may comprise steps of:
1. Determining at least one potential victim
2. Determining the transmit activity of the at least one potential victim
3. [Optional] Determining the transmit activity of the at least one potential victim
4. [Optional] Determining the transmit activity of the at least one potential aggressor
5. Recognize a condition and extract a matching result
6. [Optional] Predict a matching result based on the extracted matching result
7. Perform at least one action based on the matching result The example steps above may be implemented, e.g., in a wireless device or radio network node or network node. In one example, the node implementing the steps may be a receiving/measuring radio node (e.g., a wireless device or radio network node). In another example, the node implementing the steps may be a node providing or building up the assistance data (e.g., a radio node, a radio network node, a positioning node, other network node) to assist the receiving/measuring node in handling the aggressor interference. In yet another example, it may be a transmitting node (victim or aggressor) or a node coordinating transmissions of the at least one of them. The transmitting nodes may e.g. adapt their transmissions to facilitate handling the aggressor interference at the receiving/measuring radio node.

The results of any of the steps above (e.g., data related to potential or confirmed aggressor, aggressor transmitter activity, potential or confirmed victim, victim transmitter activity, matching result, or predicted matching result) may be
- Stored in internal or external memory of the obtaining node (e.g., a receiving/measuring node, a node configuring measurements or assistance data, serving node), and/or
- Transmitted, at least in part, to another node (e.g., receiving/measuring node, another wireless device, another radio network node, a network node in general).

These results may be used, e.g., for adapting the receiver next time in similar conditions, configuring transmissions of the aggressor or victim (see e.g. Embodiment 4), configuring assistance data for assisting in handling aggressor interference (e.g., when storing at the configuring node), optimizing radio measurement configuration, radio network planning and optimization, etc.

The example steps above may also be in a different order and may also be complimented with other steps.

The steps are described in more detail by means of the following example embodiments.

Determining a Potential Victim

A potential victim may be any signal/channel which a receiver may need to receive or perform measurements on for which an interference issue may be expected. Whether the potential victim is a victim or not is determined based on the matching result.

In one simple example, a victim is a measured cell or a cell to be measured. It may be a serving cell. Or in another example, it may be a neighbor cell.

A set of potential victim signals may be obtained in different ways, e.g., by one or any combination of:
- Pre-defined set or pre-defined rule for deriving a set of potential victim signal set (e.g., based on a deployment scenario, environment, receiving/measuring node's capability, etc.)
  - Such pre-defined set may be stored in the memory and fetched upon a specific condition (e.g., "Rel-X network is synchronous" and the "strongest received signal power is above a certain threshold"), without performing the matching step every time
- Autonomously determined by the node implementing this embodiment
- Dynamically configured (e.g., for a specific measurement or service type or responsive to an interference condition)
- Indicated in the data received from another node, where the data may be provided e.g. pro-actively, upon a request, upon an event, or upon a condition (for example, an indication of that a specific signal type or time and/or frequency resource may suffer from high interference may be received upon entering a specific area)
- Obtained from the stored victim cell history,
- Derived based on collected statistics indicative of performance of certain signals (or measurements on certain signals) due to high interference in the conditions which are the same or similar to the current one.

The set may be an empty set, a set of one victim signal or associated entity, or a set of more than one victim signals or associated entities.

Figure 3:
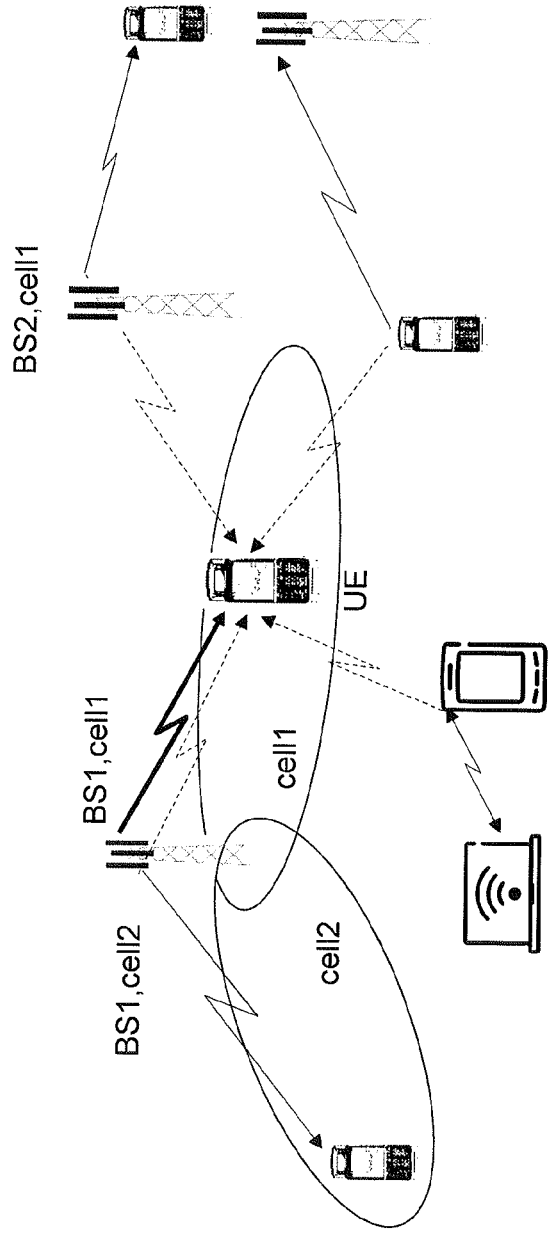
FIG. 3 illustrates an example interference scenario.
Figure 4:
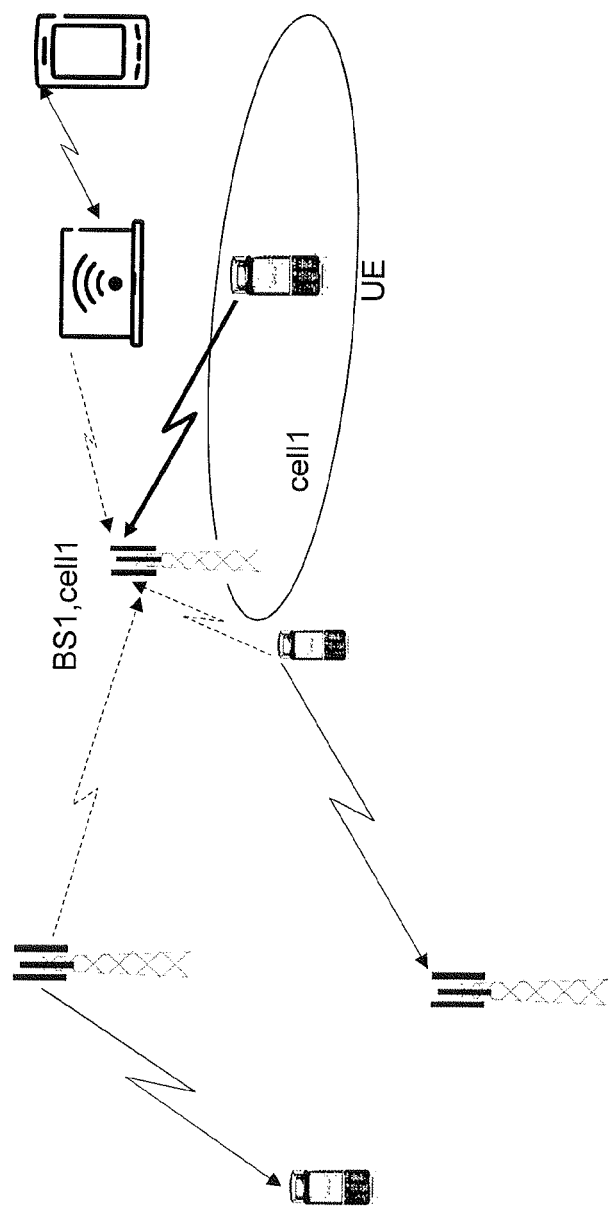
FIG. 4 illustrates another example interference scenario.

In one example, a potential victim may be defined for certain scenarios or conditions, e.g., when at least one of the below may apply:
- A radio node is in a cell rage expansion zone (victim signals may be e.g. DL signals received by the radio node from the expanded cell, and aggressor may be a neighbor cell signal)
- A radio node receiving neighbor cell signals in DL (victim signals may be e.g. a neighbor cell DL signal, and aggressor may be a serving cell signal)
- A radio node is transmitting in the coverage area of a CSG cell (victim signals may be e.g. an UL signal from a wireless device served by the CSG, and victim may be an UL signal transmitted by the radio node which is not a CSG member)
- The received interference is above a threshold
- The receiving/measuring node is a wireless device receiving transmissions from another wireless device via device-to-device communication (victim signal may be the signal being received from the other device and aggressor signal may be an UL or a DL signal from a third radio node)
- TDD system with asynchronous cells or cells with misaligned UL-DL subframe configuration
- Some scenarios are illustrated in FIGS. 3 and 4.

Determining a Potential Aggressor

A potential aggressor may need to be determined, e.g., by the receiving/measuring radio node or another node assisting the receiving/measuring node in operating in the presence of aggressor interference.

The receiving/measuring radio node may determine a potential aggressor, e.g., by
- Receiving an explicit indication from another node (e.g., receiving a PCI or even a specific signal indication which may be a potential aggressor critical for receiver performance),
- Obtaining from memory or stored history of aggressor signals e.g. if UE was served by aggressor cell(s) recently or in the past or has received the aggressor information from another node earlier or in the past,
- Using the stored serving node information (e.g., after handover from a first serving cell to a second serving cell on the same frequency, signals from the first serving cell may be potential aggressors for signals in the second serving cell),
- By blind detection of signals transmitted by neighbor nodes.

The obtained potential aggressor information may be stored, e.g., a list of aggressor PCIs associated with a certain serving node, which may also be complemented with other information such as a time/date stamp. The stored aggressor information may be used, e.g., for configuring the receiver in similar conditions or for reporting the aggressor statistic to a network node.

The obtained potential aggressor information may also be stored after it has been confirmed/verified that the potential aggressor is the true aggressor, e.g., based on a matching result.

The potential aggressor may need to be determined by the node configuring assistance data, e.g., for assisting the receiver in handling aggressor interference. The configuring node may predict or estimate the received signal strength of the aggressor and it's relation to the victim (e.g., find N (N>=1) strongest cells for the UE, which are X dB above the expected victim received signal strength). The set of aggressor cells in the assistance data may or may not be restricted to a specific type of aggressors (e.g., CRS-to-CRS to SSSto-SSS aggressors). Aggressor type (e.g., CRS-to-CRS, PBCH-to-PBCH, SSS-to-SSS, PDSCH-to-SSS, etc.) may also be comprised in the assistance data. In one embodiment, if there are more than one cells in the list, the UE should be able to know which is the expected strongest interferer, e.g., based on a pre-defined sorting/ordering, e.g., by the expected signal strengths in the increasing or decreasing order.

Even more examples on the assistance data, its creating and using, are provided in Embodiment 3.

Determining Transmitter Activity

The transmitter in this embodiment may relate to either victim or aggressor transmitter.

The transmitter activity may comprise one or any combination of:
- time and/or frequency resources (e.g., one or more of: radio frame, subframe, symbol, subcarrier, resource block, carrier frequency, bandwidth) when a transmission may occur and/or when the transmission may not occur,
- transmission probability, and
- transmission power level.

The activity may depend on the signal/channel type, e.g., it may be pre-defined that certain signals are always transmitted in certain time- and/or frequency resources (e.g., CRS from at least antenna port 0 and synchronization signals are always transmitted according to a predefined pattern; control channels are typically transmitted in first symbols of a subframe).

The activity may depend on a type of the time- and/or frequency resources, e.g., normal subframes vs MBSFN subframes or subframes for short-range communication or ABS subframes or positioning subframes, where the type of the resources may be associated with a pre-defined set of allowed transmissions and/or restricted transmissions.

The activity may depend on time- and/or frequency resource and may also follow a configurable or pre-defined pattern. For example, periodic Semi-Persistent Scheduling (SPS) or Sounding Reference Signals (SRS) transmissions and periodic Master Information Block (MIB) or SIBs transmissions follow a configurable and a pre-defined pattern, respectively. There may also be a combination thereof, e.g., the first data transmission may be scheduled on available resources, but a Hybrid Auto-matic Repeat reQuest (HARQ) retransmission appears with a pre-defined interval starting from the first transmission. Transmit inactivity may also be described by patterns, e.g., DL ABS patterns imply that some signals (e.g., PDSCH) would typically be not transmitted.

The transmission activity may thus be also associated with resources, and also multiple activity levels may be determined in this step, e.g.: full/100% activity in set 1 of resources and reduced activity in set 2 of resources, where the reduced activity may be a lower transmission probability and/or lower transmit power than a reference activity level (e.g., the reference activity may be the activity of the same signal in certain set of resources or the activity of another signal).

The transmitter activity may be obtained in different ways, e.g., by any one or a combination of:
- explicitly from another node (e.g., in the assistance data indicative of a parameter related to signal sequence, time and/or frequency resources for transmission, a transmit pattern, or absolute or relative transmit power level, etc.)
- implicitly or derived based on the information received from another node (e.g., with positioning assistance data indicating when PRS are transmitted; assistance data indicative of time and/or frequency resources used for transmissions, including relative timing offsets, etc.)
- derived based on a pre-defined rule (e.g., based on a mapping to resource elements in TS 36.211)
- determined by the node based on measurements (e.g., the receiving/measuring node blindly determines a transmit pattern of at least one signal transmitted by another node; the receiving/measuring node determined the activity of an aggressor node based on the interference profile over a time period, etc)

Determining Receiver Activity

The receiver activity may be described, e.g., by time and/or frequency resources (e.g., time period, receiving or measurement bandwidth, etc.) for receiver activity, inactivity, reduced activity, or best-effort activity. In one example, the receiver activity may further be associated with receiving one or more signal types, measurement types, service types, or node's actions.

The receiver activity may be described, e.g., by a pattern. Some examples of receive or measurement patterns are:
- Measurement resource restriction pattern for inter-cell interference coordination (may or may not be the same as the aggressor transmit pattern)
- Receive activity pattern (e.g., Discontinuous Reception (DRX) DL or DRX UL)
- Measurement gap pattern
- Autonomous gap pattern
- Duplex configuration (e.g. TDD, Half-Duplex Frequency Division Duplex (HD-FDD)) and related UL-DL subframe configuration (e.g., TDD UL-DL subframe configuration, TDD special subframe configuration)
- Patterns ensuring co-existence of multiple systems, which may limit a set of time and/or frequency resources available for receiving signals/channels or performing measurements e.g. due to out-of-band or spurious emissions.

The receive patterns indicating resources with preferred interference conditions (e.g., low-interference subframes) may or may not be directly associated with transmissions of potential victim signals or potential aggressor signals, e.g., some signals may be transmitted irrespective of the receive pattern.

It is also important for a receiver to have longer continuous inactivity periods e.g. to save the battery. Therefore, it may be preferred that when the receiver is active it performs more than one task whenever possible and whenever the receiver complexity allows.

The receiver activity information may be obtained in different ways by the node implementing this embodiment, e.g.:
- Received from a node configuring measurements, e.g., serving eNodeB→wireless device
  serving eNodeB→another network node (e.g., neighbor eNodeB, LMU, etc.)
  coordinating node (e.g., a macro BS)→wireless device
  coordinating node (e.g., a macro BS)→another network node (e.g. eNodeB, LMU, etc)
  positioning node→wireless device
  positioning node→another network node (e.g., eNodeB, LMU, etc.)
- Received from or via another node (e.g., a wireless device or a network node)

Received via cross-layer communication or a node-internal interface, e.g.,
cell 1 of eNodeB→cell 2 of eNodeB
Decided autonomously by the receiving/measuring node
Obtained autonomously by the node other than the receiving/measuring node (e.g., based on received measurement configuration information, measurement results and/or statistics)
Matching of the Potential Activity of Signals Transmitted by the Transmitters of Victim Radio Node(s) and Aggressor Radio Node(s)

Matching may apply for DL or UL victim signals and their aggressors. The matching may independently be applied to each serving cell and corresponding aggressor cell(s) in multi-carrier or carrier aggregation operation.

The matching step uses as input at least the information about
Potential victim (e.g., signal(s) or channel(s)) and its transmit activity (e.g., when transmitted and the time-frequency resources), and
Aggressor (e.g., signal(s) or channel(s)) and its transmit activity (e.g., when transmitted and the time-frequency resources, and when possibly not transmitted)
but it may also use other information, e.g.,
time (mis)alignment of the signals transmitted by the victim transmitter and aggressor transmitter (e.g., time shift which impacts overlap ratio).
One example of time shifting is where one or more symbols are misaligned between victim and aggressor transmitted signals e.g. start of symbol #0 in victim cell coincides with the start of symbol#6 in aggressor cell or vice versa.
Another example of time shifting is where the slot is misaligned between victim and aggressor transmitted signals e.g. start of slot#0 in victim cell coincides with the start of slot#1 in aggressor cell or vice versa.
Yet another example of time shifting is where one or more subframes are misalignment between victim and aggressor transmitted signals e.g. start of subframe #0 in victim cell coincides with the start of subframe #3 in aggressor cell or vice versa.
Yet another example of time shifting is where one or more frames are misalignment between victim and aggressor transmitted signals e.g. start of frame #0 (e.g. System Frame Number (SFN)=0) in victim cell coincides with the start of frame #10 (e.g. SFN=10) in aggressor cell or vice versa.
Yet another example of time misalignment is where a victim signal and aggressor signals are expected to received within a CP length (e.g., the maximum time difference is at most 4.7 micro seconds for a normal CP).
receiver activity of the receiving/measuring node (e.g., to determine the time instances of interest for performing measurements)
synchronization level or accuracy between the victim and the aggressor radio nodes (which may also impact overlap ratio). For example the accuracy can be expressed in terms of the maximum absolute time difference between the start of the frames of the victim's transmitter and aggressor's transmitter. For example the magnitude of the accuracy can be between 3-10 µs. The larger is the cell size of victim and aggressor cell, larger is the magnitude of the accuracy.
receiver capability related to managing the aggressor interference (e.g., an aggressor for a low-performance device may be not an aggressor for a high-performance device)
target measurement quality or channel reception quality (e.g., a pre-defined requirement of accuracy, measurement period, Block Error Rate (BLER), maximum reporting failure rate, etc. may be used to categorize or prioritize victim signals; a potential victim signal used for best-effort measurements may be categorized as non-victim or given a lower priority)

Some example results of the matching step may be, e.g., any one or more of:
An indication that the potential aggressor is an aggressor critical for the receiver,
An indication that the potential victim is a victim with respect to the potential aggressor,
Physical impact of the aggressor on the victim, e.g.,
the amount signal overlap in time and/or frequency domain, with possible criticality classification of the victim-aggressor relation (example: "critical overlap", "medium overlap" or "no or small overlap"), or
the amount signal overlap in time and/or frequency domain categorized into more than one set of resources (example: "critical overlap" on a resource set 1, "medium overlap" on a resource set 2, and "no or non-critical overlap" on resource set 3).
Performance impact estimate, e.g.,
"high performance impact" when the aggressor interference is high (e.g., above a threshold) or the received signal difference is high (e.g., above a threshold), with possible criticality classification of the victim-aggressor relation (example: "critical performance impact", "medium performance impact" or "no or non-critical performance impact")
Overall impact accounting for overlap and performance impact (may also be categorized into more than set of resources), e.g.,
"critical impact" when there is at least one of: "critical overlap" and "critical performance impact",
"no or non-critical impact" when both apply: "no or non-critical overlap" and "no or non-critical performance impact",
"medium impact", otherwise.

In the above, some examples of resource set 1, resource set 2, and resource set 3 may be control channel region of a subframe, data region of a subframe when aggressor is configured with ABS, and data region of a subframe when aggressor is configured with MBSFN ABS with a blank MBSFN.

To obtain the results above, in one example, it may be useful to create the following sets (subsets may be determined based on a condition or a rule) based on the input to the matching step:
set1, comprising all or a subset of time- and/or frequency resources when potential victim signal is transmitted,
set2, comprising all or a subset of time- and/or frequency resources when potential aggressor signal is transmitted,
set3, comprising all or a subset of time- and/or frequency resources where the receiver is active (e.g., for general purposes such as DRX ON periods and/or over a receiver measurement bandwidth),
set4, comprising low-interference time- and/or frequency resources when the some of the aggressor signals and/or other radio node's are not transmitted or have a low transmit activity (e.g., subframes, or their parts, when aggressor is configured with ABS or blank MBSFN)

set4 may or may not be a compliment of set2 and it may or may not be comprised in set3 in one example, set4 and set2 may overlap, e.g., when the aggressor signal is transmitted but at a lower power level;

in another example, set4 may comprise measurement resource restriction pattern configured for the receiving/measuring node (e.g., DL or UL, serving or other cells).

A subset of the time- and/or frequency resources (e.g., a subset of set1, set2, or set2) may be selected, e.g., based on one or more additional conditions.

In an example, the amount of overlap may be estimated based, e.g., on any one or more of:

number of overlapping Resource Elements (REs) for set1 and set2 number of overlapping REs for set1 and set4 number of overlapping REs for set1, set2, and set4 number of overlapping REs for set1, set2, and set3 number of overlapping REs for set1, set4, and set3 number of overlapping REs for set1, set2, set4, and set3

When estimating performance impact, in a further extension of the example above, an overlap estimate may also be associated with a specific transmit power level of the aggressor signal which may be different in different resource sets.

In another example, the amount of overlap may be estimated, e.g., as a percentage or ratio of the overlapping REs to the total amount of time-frequency resources when victim signal is transmitted and/or may be measured. The amount of overlap may also be for a specific victim-aggressor combination, which may be described, e.g., by parameter $$r_{victim \leftarrow aggressor_i} = \frac{|\Omega_{victim} \cap \Omega_{aggressor_i}|}{|\Omega_{victim}|} \cdot 100\%,$$

where $\Omega_{victim}$ is the set of time-frequency resources where victim signals are transmitted (e.g., set1) and/or may be measured, and $\Omega_{aggressor}$, is the set of time-frequency resources where aggressor signal aggressor, are transmitted (e.g., set2).

When victim signals are interfered by different aggressor signals on different time-frequency resources (e.g., CRS in data region of a subframe in a synchronous network may be interfered by aggressor CRS, PBCH, PDSCH, or other signals), then the total aggressor overlap may be estimated as the sum of overlap ratios over all aggressor signals, e.g.:

$$r_{victim \leftarrow aggressors} = \sum_i r_{victim \leftarrow aggressors_i}$$

$$= \sum_i \frac{|\Omega_{victim} \cap \Omega_{aggressor_i}|}{|\Omega_{victim}|} \cdot 100\%.$$

$r_{victim \leftarrow aggressors} \leq 100\%$, i.e., when it is 100% the victim signals are always interfered by some aggressor signal, but when it is below 100% there are some time-frequency resources not interfered by aggressors (there may still be some interference though from transmitters not classified as aggressors).

As described earlier, the matching may be performed by any node, e.g., by the receiving/measuring node or by a node configuring and/or transmitting assistance data for assisting the received in handling aggressor interference. Matching results may be used, e.g., for adapting the receiver (see, e.g., Embodiment 2) or building up assistance data or explicitly signaled to another node, e.g., by a network node (e.g., eNodeB or positioning node) to the receiving/measuring radio node (wireless device or another eNodeB), or by receiving/measuring radio node (wireless device or another eNodeB) to a network node (e.g., positioning node or eNodeB), or by a network node (e.g., eNodeB, positioning node, SON, O&M) to another network node (e.g., eNodeB, positioning node, SON, O&M), where none of the network nodes may be a receiving/measuring radio node.

Recognizing a Condition and Extracting a Matching Result

Extracting may comprise extracting from an internal or external memory. The memory may be used for storing temporary or permanent data, e.g., Random-Access memory (RAM) or Read-Only Memory (ROM).

Recognizing a condition may be comparing one or more characteristics to the corresponding reference (e.g., predefined) value(s) for which matching result may be known.

An example set of conditions:

Number of CRS antenna ports in a victim cell, $n_{tx}^{victim}$, does not exceed that of the aggressor cell, $n_{tx}^{aggressor}$, i.e., $$n_{tx}^{victim} \leq n_{tx}^{aggressor}.$$

Zero time offset between the victim and aggressor transmitters (e.g., SFN-aligned LTE cells), i.e., $$\Delta t = 0.$$

When the above set of conditions is recognized, it may be assumed that matching results shown in Table 1 may apply, assuming victim and aggressor signals of interest (e.g., CRS in CRS-to-CRS case) are transmitted in the same subframe. Note, however, that although with the condition $\Delta t=0$ this is always the case in the current LTE releases, this may not always be the case in future release, e.g., with new carrier types reference signals (and possibly synchronization signals, MIB and/or SIB1) density may be different in aggressor and victim and perhaps the configuration may have different time shifts in the aggressor and victim. Note also that Table 1 does not capture all possible signals (victim or aggressor) that may be transmitted, e.g., PRS, PDSCH (containing data or paging), DM-RS, MBSFN RS, Physical Multicast CHannel (PMCH), control channels are not captured in the tables; it is, however, obvious that if $r_{CRS \leftarrow CRS}$ is 100%, then there are no other signals from the same aggressor transmitter colliding with victim CRS, whilst $r_{CRS \leftarrow CRS}$ equal to 0 may or may not mean that there are other aggressor signals from the same transmitting node that interfere with victim CRS.

Note also that matching results for $n_{tx}^{victim} > n_{tx}^{aggressor}$ may be different at least for $r_{CRS \leftarrow CRS}$ and $r_{CRS \leftarrow MIB}$ and may depend on the exact transmit antenna port configurations. In one example, $r_{CRS \leftarrow CRS}$ in Table 1 is an upper bound (i.e., "greater than") for $r_{CRS \leftarrow CRS}$ with $n_{tx}^{victim} > n_{tx}^{aggressor}$ and $\Delta t=0$.

TABLE 1

Example matching results for DL, $n_{Rx}^{victim} \leq n_{Rx}^{agressor}$ and $\Delta t = 0$.

| $\Delta f^{Note\,3}$ | | MBSFN is configured in aggressor cell: | no | | yes | |
|---|---|---|---|---|---|---|
| | | MBSFN is configured in victim cell: | yes | no | yes | no |
| $\Delta f = 0$ | $r_{CRS \leftarrow CRS}$ | | 100% | 100% | 100% | 100% or 0%$^{Note\,1}$ |
| $\Delta f \neq 0$ | $r_{CRS \leftarrow CRS}$ | | 0% | 0% | 0% | 0% |
| | $r_{CRS \leftarrow MIB}$ | | 0% | X %$^{Note\,2}$ | 0% | 0% |
| Any $\Delta f$ | $r_{PSS \leftarrow PSS}$, $r_{SSS \leftarrow SSS}$ | | N/A | 100% | N/A | 0% |
| Any $\Delta f$ | $r_{MIB \leftarrow MIB}$ | | N/A | 100% | N/A | 0% |
| Any $\Delta f$ | $r_{SIB1 \leftarrow SIB1}$ | | N/A | 100% | N/A | 0% |

$^{Note\,1}$100% in the 1$^{st}$ Orthogonal Frequency Division Multiplexing (OFDM) symbol and 0% in other CRS symbols of the victim cell
$^{Note\,2}$X depends on the CRS measurement bandwidth, subframe number, and CRS symbols (there is a collision from PBCH in the 6 center RBs in the subframes with transmitted PBCH); can be up 33.33% for $n_{Rx}^{victim} = N_{Rx}^{aggressor} = 4$ and CRS measurement bandwidth of 6 RBs.
$^{Note\,3}$$\Delta f$ is a subcarrier shift in frequency, currently applies only to CRS and depends on the relation between victim and aggressor PCIs. For example, $\Delta f$ may be calculated as $\Delta f = (PCI^{victim} - PCI^{aggressor}) \mod N$, where N may be 3 or 6 which may depend on $n_{Rx}^{victim}$, $n_{Rx}^{aggressor}$ or both. In one example, N = 6 for $n_{Rx}^{aggressor} \geq n_{Rx}^{victim} \geq 1$.

Predicting a Matching Result Based on the Extracted Matching Result

Overlap ratio of victim signals with aggressor signals depends on time-frequency resources used for their transmissions (which may be strictly pre-defined for at least some signals, e.g., CRS, synchronization signals, control channels, PBCH used for MIB, SIB1 over PDSCH, etc., and may be pre-defined as a set of possible resource for other signals transmitted on the need basis, e.g., data transmissions over PDSCH, control channels associated with data, etc.), and transmit activity of victim and aggressor signals (particularly of those that may or may not be transmitted or may be transmitted with a different configuration, e.g., at a lower transmit power), and may also depend on the receiver activity, since this may or may not exclude some of the time-frequency resources where a collision occurs.

However, the overlap ratio of different victim signals may depend on each other. For example, when $r_{SIB1 \leftarrow SIB1} = 100\%$, it may be possible to predict the overlap ratio for CRS-to-CRS, MIB-to-MIB, PSS-to-PSS, and SSS-to-SSS (see, e.g., Table 1).

Performing at Least One Action Based on the Matching Result

The example actions performed based on the matching result may be, e.g., adapting receiver of the receiving/measuring node (see, e.g., Embodiment 2),
adapting at least one measurement procedure,
building up assistance data (see, e.g., Embodiment 3),
providing assistance data to the receiving/measuring node (e.g., to assist the node in receiving the signals and achieve a better measurement quality)—see e.g. Embodiment 3,
creating a message comprising the aggressor information,
providing the aggressor information to a neighbor node (e.g., to assist in handover),
configuring a victim or aggressor transmission (see, e.g., Embodiment 4),
storing the aggressor information in a database,
collecting victim and aggressor statistics, and/or
any network management task (see, e.g., Embodiment 4).

Embodiment 2

Methods in the Receiving/Measuring Node for Adapting its Receiver Accounting for Aggressor Interference Embodiments described in this section may be combined, at least in part, with embodiments described in other sections.

The basic idea of this embodiment is that a receiving/measuring radio node (e.g., a wireless device or a radio network node) adapts its receiver type for receiving victim signals responsive to the information related to the aggressor interference. There may be more than one aggressor signals, DL, UL, or both.

The adaptation may be applied independently for each aggressor and/or each victim, but may also be adapted jointly for more than aggressor and/or more than one victim, where multiple aggressor signals may be from the same or different transmitters and on the same or different frequencies, and multiple victim signals may be from the same or different transmitters and on the same or different frequencies. Furthermore, the adaptation scheme may be different for a single aggressor and/or single victim from that for multiple aggressors and/or multiple victims. For example, when a UE is in carrier aggregation, each serving cell typically has different set of aggressor cell(s). Therefore based on receiver adaptation, it is possible that the UE uses different receiver types in different serving cells, especially if the conditions (e.g. radio conditions) are different for different aggressor cells. In case of single-carrier CoMP or RRH scenario, the CoMP cluster (comprising of multiple legs or links), all links may have the same or common aggressor cell(s). In this case the UE may use the same or even different receiver types based on adaptation.

The mechanism of receiver adaption is elaborated with an example considering three receiver types: receiver type A, i.e., the first receiver type, receiver type B i.e., the second receiver type, and receiver type C, i.e., the third receiver type.

The receiver type A may be a baseline or default receiver which is not capable of mitigating interference experienced from aggressor signal(s) or it can only mitigate the interference only if it is below a certain threshold level. On the other hand, receiver types B and C are capable of mitigating the interference received from aggressor signal(s). The receiver type B is considered to be efficient in a first set of scenarios, whereas receiver type C is considered to be efficient in a second set of scenarios where the first and the second sets of scenarios overlap or the first set of scenarios is comprised in the second set of scenarios. Receiver type B may be more efficient (e.g., either in terms of resource (e.g., processing, power, or memory) consumption or in terms of performance of handling the interference) than receiver type C, at least in some scenarios or conditions. Any of the receivers B and C may or may not be limited to handling interference of a certain type, e.g., from certain physical signals/channels. Some examples of receiver type B are puncturing receiver or a receiver doing joint (e.g., for aggressor and victim) channel estimation. An example of receiver C is inter-cell interference cancellation receiver. In a more specific example, receiver C may be an inter-cell interference cancellation receiver for mitigating the interference from reference signals (e.g., CRS).

Methods of Obtaining the Information Related to the Aggressor Interference

The information related to the aggressor interference may be obtained in different ways, e.g., any one or any combination of:
- Received explicitly via higher-layer signaling from another node (e.g., from a wireless device or a network node), e.g.,
  - the assistance data provided via RRC by eNodeB to a wireless device for enhanced inter-cell interference coordination,
  - the data associated with inter-cell interference coordination received by a wireless device from a radio network node via another radio network node, e.g., at a handover,
  - assistance data for performing positioning measurements received by a wireless device or a radio network node from positioning node or another radio network node (positioning assistance data may comprise a measurement pattern and in some examples may also comprise e.g. a muting pattern);
- Implicit or derived information, e.g.
  - neighbor cell list provided for a general RRM or mobility purpose, which indicates neighbor cells though does not explicitly indicate aggressor signals or aggressor cells;
- Obtained based on measurements and via lower-layer signaling, e.g.,
  - Detecting a cell or another radio node (e.g., detecting the presence of a close neighbor radio node or a radio signal with a certain signature),
  - Identifying a cell or another radio node by receiving and identifying a radio signal (detecting and verifying that the signal by e.g. performing a measurement),
  - Reading system (SI) information of another cell. For example the SI can be acquired when UE is requested to read CGI of a neighbor cell.

A yet another example is that of the assistance data and the means for obtaining are described in Embodiment 3, including composite assistance data.

The obtained information related to the aggressor interference may comprise, e.g., any one or more of: data related to the potential aggressor, aggressor activity, and a matching result (see Embodiment 1).

A transmission or a transmitter may be classified as an aggressor, e.g., as described in Embodiment 1.

In on example, the receiving/measuring radio node may also collect statistics related to the performance of a specific receiver type (e.g., resource utilization/consumption, performance characteristics, success rate, etc., which may be also associated with a certain condition and/or location that may also be collected and associated with the characteristics). Collecting the statistics may be performed autonomously by the receiving/measuring node or based on the data received from another node(s). The collecting may comprise obtaining and storing in memory the related characteristics or a result of their processing. The collected statistics may also be used for adapting the receiver.

Methods for Selecting a Receiver Type

According to this embodiment, the receiver adapts (i.e., by means of selecting an appropriate receiver type) based on the obtained information related to the aggressor interference. The receiving/measuring node may also perform matching prior adapting the receiver, and the receiver adaption may be the at least one action based on the matching result (see, e.g., Embodiment 1).

The receiver type may be selected, e.g.,
- based on a condition related to the information about the aggressor interference, or
- upon an event, or
- autonomously or upon an indication or instruction from another node, or
- with any combination of the above.

Methods of Adapting are Described Herein by Examples.

Example Conditions:

Generally, when a condition is used for adapting the receiver, if a certain condition or a certain set of conditions hold, then receiver type X is selected, otherwise receiver type X is not selected. There may also be a multi-level receiver adaption decision, e.g., if condition 1 holds, select received type X, otherwise if condition 2 holds select receiver type Y, otherwise select receiver type Z. In one example, receiver type X may be receiver type A, receiver type Y may be receiver type B, and receiver type Z may be receiver type C, where the receiver types A, B, and C have been described earlier herein.

Some example set of conditions is as below (may be used for receiver adaption separately or in any combination):
- availability of the assistance data which is valid and applicable (see Embodiment 3) for a candidate receiver type,
- absolute and/or relative received signal powers of victim and aggressor (e.g., may be compared to a threshold to form a decision for the receiver adaptation),
- synchronization level between victim and aggressor cells (e.g., receiver type C may require the tightest synchronization),
- a matching result indicates at least one of:
  - total (critical and non-critical) overlap ratio is above a threshold,
  - critical overlap ratio is above a threshold,
  - overlap density in time is above a threshold,
  - overlap density in frequency is above a threshold.

Additionally, at least one of the following conditions may also be considered:
- number of simultaneous victims (e.g., up to N for aggressor type C and up to M for aggressor type A, N<M),
- number of simultaneous aggressors (e.g., up to K for aggressor type C and up to L for aggressor type A, K<L),
- UE speed (e.g., receiver C may be preferred when the speed is below a threshold, e.g., 15-30 km/h),
- receiver switching capability (e.g., it may be better to not switch too often to save resources and compromise some performance instead), e.g. when the overlap ratio varies by symbol such as when victim cell is non-MBSFN with 4 CRS symbols and aggressor cell is MBSFN with 1 CRS symbol and therefore the CRS overlap in the first symbol may be 100% and it may be 0% in other symbols, so it may be preferred to use one receiver type without switching between the first symbol and other symbols; in another example, if such a switching is possible than different receiver type could receive the signal in the first symbol and another one in the other symbols and the results could then be combined by the receiver (also different combining weights are possible since the results in the first symbol may be less accurate/reliable).
- parallel receiver capability (e.g., whether it is possible to use two receiver types in parallel),
- bandwidths (e.g., any of: system BW≥transmit BW≥measurement BW) of the aggressor and victim, but possibly also of the serving cell (which may further reduce the measurement bandwidth, depending on the retuning capability)

expanding measurement bandwidth may be used as a means to reduce the overlap ratio and to increase the number of time-frequency resources where the overlap does not occur and hence the receiver type A may be used hence the receiver may jointly adapt the measurement bandwidth or select frequency resources and adapt the receiver type number of parallel measurements (may also be referred to as "parallel criteria" in TS 36.133), hardware resources e.g.
memory and/or processor, currently available or unused hardware resources e.g. currently available memory and/or processor resources, battery level (e.g., receiver C may require more processing and hence may be less preferred when the remaining battery level is low), activity state or activity level e.g.
whether in DRX or in non-DRX
DRX cycle length in case UE is in DRX target quality of the measurement or channel reception (e.g., high quality, minimum-requirement quality, or best-effort), where the quality may comprise any one or more of: measurement accuracy, BLER, measurement period, etc.

collected receiver type statistics (e.g., resource consumption, performance characteristics, or success rate, which may be also associated with a certain condition and/or location)

same or different CP length of the victim and aggressor signals

Example Events

The following are some examples of events, e.g.:

Connection (re)establishing (e.g., receiver type A may be a default one at such an event)

Entering a certain area (e.g., a Cell Range Expansion (CRE) zone, a synchronization area, etc.)

Handover or cell reselection or carrier reselection,

Activity state switching (e.g., going from IDLE to CONNECTED, DRX to non-DRX, energy-saving mode to normal operation, etc.)

Combining Two or More Results Obtained by Different Receiver Types

Since the aggressor interference may vary in time, e.g., due to mobility, varying radio channel, or even due to the transmission pattern (e.g., signal mapping to the resource elements on the time-frequency grid as in TS 36.211), more than receiver type may be used during one channel estimation or measurement period. Hence, with two receiver types, two types of results may be available at the radio node. According to one example, these results may be combined by the radio node and the combining method may be determined by the receiver types used. The combining of the results can be done by a suitable function. Some non-limiting examples of function for combining the results are averaging, weighted averaging, moving averaging, cumulative moving averaging, weighted moving averaging, sliding window, etc. In the approach where different weights may be used, the weights may be determined e.g. by the receiver type (e.g., the result obtained with a more accurate receiver type may be assigned a higher weight), the periods over which the first and the second results were obtained, the number of samples processed, the interference levels associated with times when the different receiver types were used, bandwidth, etc.

The results may be combined when, e.g., one or more of the following situations occur:

Same aggressor(s) but different receiver types corresponding e.g. to different interference conditions (e.g., the total interference, excluding the aggressor interference, may also vary and determine the selection of different receiver types), Same aggressor but varying aggressor impact over time and/or frequency, e.g., due to location when the UE is moving during the measurement and the relative strengths of victim and aggressor change, Different aggressor(s) resulting in different receiver types.

In one example, after combining the combined results may be used by the radio node for further adapting the receiver type. The combined results lead to more accurate decision for adapting the receiver. This in turn results in better receiver performance (e.g. higher received bit rate) and may also reduce power consumption prolonging the battery life.

In another example, the possibility of combining results obtained with multiple receiver types adds more flexibility to adapting the receiver or even makes it possible at all without restarting measurements (and thus completing measurement in a shorter time and with a better performance and more adaptive to interference conditions), etc. Thus, if the receiver is capable of combining results of at least two receiver types, the receiver may choose to change the receiver type without restarting the measurement.

Embodiment 3

Methods for Managing Assistance Data for Assisting a Receiver in Handling Aggressor Interference Embodiments described in this section may be combined, at least in part, with embodiments described in other sections.

Next, methods for managing assistance data (or related measurements or statistics) for assisting a receiver in handling aggressor interference are described. In different examples, "managing" may comprise e.g. any one or a combination of:

building up or updating the assistance data, providing the assistance data or its part (e.g., when being updated, only the new information may be provided to reduce overhead) to a receiver to facilitate handling aggressor interference, deciding when (e.g., time, upon which event or upon which condition) the assistance data is to be provided or updated, deciding how the assistance data is to be provided (e.g., which nodes are to be involved), maintaining a database used for building up the assistance data, obtaining or collecting measurements and/or statistics for using when building up the assistance data, activating/deactivating assistance data.

Updating the assistance data may comprise, e.g., any one or any combination of:

Modifying at least one element of the assistance data,

Removing at least one element of the assistance data,

Adding at least one element of the assistance data,

Restarting a counter associated with the assistance data (e.g., a validity counter), Assistance Data for Handling Aggressor Interference The assistance data may comprise one or more data sets (multiple, e.g., in the case of composite assistance data). At least one data set is provided by the network node managing the assistance data to the receiving/measuring radio node. A data set further comprises information about at least one potential aggressor. The information may further comprise an identification identifying the aggressor signal and/or the aggressor transmitter (e.g., signal type, aggressor type, cell identification, an identification used to construct the signal sequence, etc.). In another example, the information may comprise aggressor transmitter activity information.

In yet another example, the assistance data may comprise one or more matching results (see, e.g., Embodiment 1) or the information enabling performing matching by the receiving/measuring node. The matching results may also be used to determine the aggressors for which the information is to be included in the assistance data. For example, a potential aggressor signal may be classified as aggressor signal for inclusion in the assistance data based on one or more rules such as:

$r_{victim \leftarrow aggressor_i} \geq \gamma_1$ (the overlap ratio of an aggressor signal is at least at some threshold level), performance impact of the potential aggressor signal is at the critical level.

In another example, a potential aggressor entity (a cell or a transmitting radio node) may be classified as aggressor entity for inclusion in the assistance data based on one or more rules such as:

$$\max_i \{r_{victim \leftarrow aggressor_i}\} \geq \gamma_2$$

(the overlap ratio of an aggressor signal is at least at some threshold level), performance impact of at least one of the potential aggressor signals or of the potential aggressor signal with the largest overlap ratio, where the signals are associated with the potential aggressor entity, is at the critical level (e.g., above a corresponding threshold), according to this example, in a synchronous network or for Δt=0 between the victim and aggressor, the aggressor cells may be defined based on the performance impact (e.g., received signal power difference) of victim and aggressor PSS/SSS, since the overlap ratio is 100% in this case, and not based on CRS-to-CRS overlap and performance ratios since the strongest aggressor may have CRS shifted (not overlapping) with respect to victim cell, both the overlap and the performance impact of at least one of the aggressor signals associated with the aggressor entity is at the critical level (e.g., exceed corresponding thresholds).

In yet another example, the assistance data may also comprise a receiver type indication for which the assistance data may apply.

A data set comprised in the assistance data may be provided to the receiving/measuring radio node upon a request, pro-actively, upon a triggering event (e.g., the receiving/measuring node is entering a specific area) or a triggering condition. The assistance data may be applicable immediately upon being received (and may then be used at any time by the receiving/measuring radio node) or it may be activated and/or deactivated at a certain applicability condition, event, or a triggering indication received from another node.

For being used and/or being useful, the assistance data needs to be also valid. And it is not only important whether it is valid or not, but also for how long it will remain valid, since more dynamic decisions (e.g., by the receiver or by the node managing the assistance data) may be necessary to ensure that the period when the assistance data may be used is sufficiently long, e.g., to perform target measurements. When validity does not pass verification, the assistance data may be resent, or updated, or a new assistance data may be created and/or provided to the receiving/measuring radio node.

The assistance data applicability and validity (see further some examples on both) may also determine how the receiver adapts to handle the aggressor interference (see Embodiment 2).

Specific Example of Assistance Data

In a more specific example, the assistance data for assisting the receiver in handling the interference, e.g., the aggressor interference, may comprise:

One or more of cell identifications (e.g., PCI or cell identification within a group or identification of a cell group), Example of cell identity group definition: A physical-layer cell identity (PCI) $N_{ID}^{cell} = 3N_{ID}^{(1)} + N_{ID}^{(2)}$ is uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. $N_{ID}^{(1)}$ and $N_{ID}^{(2)}$ may be associated with synchronization signals, e.g., PSS and SSS.

and at least one of the following characteristics for each of the respective cell identification:

A time alignment indicator with respect to a reference transmitter (e.g., serving cell), where the indicator in its simplest form may be a binary indicator corresponding to "aligned"/"non-aligned" ("aligned" may correspond to a perfect time alignment or a time misalignment between the aggressor transmitter and the reference transmitter below a certain threshold, whilst "non-aligned" would correspond to a larger level of misalignment between the two transmitting nodes). Time-aligned transmitters may also be transmitters with a timing measurement (e.g., timing advance or Reception-Transmission (Rx-Tx) or Round-Trip Time (RTT)) with respect to the receiving/measuring node within the same timing range. In more advanced example, a time alignment indicator has more than 2 levels (unlike in the binary case), where the levels may be "full alignment"/"medium alignment"/"no alignment"/"not known" and the levels may be even further associated with pre-defined or configured values.

In one example, when this embodiment is combined with Embodiment 2, the receiver may adapt differently for the aligned transmitters and non-aligned transmitters, and even group the transmitters by the alignment criteria Relative timing of the aggressor transmitter (e.g., a cell) with respect to a reference transmitter or reference time, such as victim cell or reference cell or serving cell SFN0. In one example, the relative timing may be in the number of symbols, slots, subframes, or radio frames, of the SFN0 of the aggressor cell with respect to the SFN0 of the reference cell.

MBSFN configuration information and transmissions in the MBSFN subframes (e.g., transmitted or not transmitted data).

A logical or geographical area associated with the MBSFN configuration (e.g., an MBSFN synchronization area). Which may be indicative of timing alignment.

Any one or more of: System Information Radio Network Temporary Identifier (SI-RNTI), Random Access Radio Network Temporary Identifier (RA-RNTI), Paging-Radio Network Temporary Identifier (P-RNTI) or Cell Radio Network Temporary Identifier (C-RNTI) for receiving and decoding the aggressor interference of a specific aggressor transmission (e.g., a data transmission, a control channel transmissions, a SI transmission or broadcast transmission).

Composite Assistance Data for Handling Assistance Interference

A composite assistance data comprises at least two data sets, e.g., a data set 1 and data set 2, which may or may not be overlapping, but the two sets are different in at least one information element. The two data sets may be provided in the same or different messages, but both sets may be valid at least for some time and the receiving/measuring node may decide to choose one of the sets based on at least one criteria.

Different data sets may also be associated with different receiver capabilities. One or more indicators associating each data set with a receiver capability or receiver type may also be comprised in the assistance data. Based on the receiver capability and/or applicability condition, the receiving/measuring radio node may adaptively select the data set corresponding to the receiver capability associated with the receiver's ability to deal with the aggressor interference (see, e.g., Embodiment 2).

The criteria may be pre-defined by a rule, explicitly or implicitly indicated by another node, and/or configured by the receiving/measuring node.

The criteria may be further verified against a condition. For example, if a condition is met, then data set 1 is used by the receiver, otherwise data set 2 is used by the receiver.

Assistance Data Applicability

The assistance data applicability may be determined by the receiving/measuring node (e.g., to activate the assistance data when the data is provided pro-actively) or a node managing the assistance data (e.g., to trigger provisioning of the assistance data).

Below are some examples of conditions which may determine (any one or in any combination) applicability of the assistance data for handling aggressor interference:

An interference condition is met (e.g., when a victim received signal strength is below a threshold, when an aggressor received signal strength is above a threshold, when an aggressor received signal strength is higher by an amount than a victim received signal strength, when the receiving/measuring node is in a CRE zone, when victim signal quality is below a threshold, or received interference is above a threshold)

A distance or distance-indicative condition (e.g., timing advance, a timing measurement, pathloss, etc.) is met, e.g., when the distance between the receiving/measuring node and an aggressor transmitter or the distance-indicative measure indicates a close distance or is below a threshold or within a range, and/or when the distance between the receiving/measuring node and a victim transmitter or the distance-indicative measure indicates a far distance or is above a threshold or within a range A matching result (see, e.g., Embodiment 1) meets a condition, A victim signal and/or an aggressor signal is of a certain type A transmitter associated with a victim signal and/or a transmitter associated with an aggressor signal is of a certain type An aggressor transmitter is active, A receiving/measuring radio node is operating or has switched to a certain carrier frequency, The receiving/measuring node is in a certain state (e.g., RRC_CONNECTED), Any one or more of receiving/measuring radio node capability, supported or currently configured receiver type(s) are of a certain type.

A condition may be verified once, upon an event or periodically. A condition may be configurable or pre-defined. A configurable condition may be configured by the same node which verifies the condition or configured by another node (e.g., a threshold is signaled by the serving node).

Validity of the Assistance Data for Handling Aggressor Interference

Validity of the assistance data is a characteristic associated with the assistance data, the characteristic verified against a reference characteristic. Some non-limiting examples are:

A counter is verified against a pre-defined or a configurable value, or

Elapsed time verified against a maximum life time, or

Current time verified against a maximum allowed time, or

Wireless device or wireless device group receiving the assistance data against an identity associated with the wireless device or the wireless device group, which are the intended receivers and/or users of the assistance data (an example group identity may be an identity associated with CSG), Activation/deactivation (or ON/OFF) indicator of the assistance data etc.

A life time of assistance data may depend e.g. on a required measurement period for a measured for which the assistance data has been provided. For example, the life time may be calculated as T+delta, where T is the required or expected measurement period, delta is an extra margin, e.g. T=1 second, delta=100 ms. In one example, the assistance data may be removed from the receiving/measuring radio node's memory after the assistance data life time expires. In another example, at least a part of the data may be further stored, e.g., for statistics or best-effort (i.e. with a lower reliability) usage by the receiver.

Validity of the assistance data may be further associated with, e.g.: a certain cell (e.g., valid until the UE leaves the cell), cell sector, an area (e.g., a geographical, logical, tracking, or local area), serving node, a synchronization aspect (e.g., a synchronization area; an MBSFN synchronization area; synchronization state or time e.g. until radio node is synchronized), and an area configured for a certain type of service or transmission (e.g., MBSFN area).

To facilitate the above verification, the assistance data may be associated with a reference characteristic, e.g., a verification certificate, an area identity, a time stamp, or a counter.

Validity of the assistance data may be verified by any one or more of: the node providing the assistance data, the receiving/measuring node, a node relaying the assistance data, or the node building up/updating the assistance data (e.g., when it is stored, may be provided to multiple wireless devices, or provided periodically).

When the assistance data is not valid, the receiving/ measuring radio node may send an error or a descriptive indication or a request for a new or updated assistance data.

In another example, validity of the assistance data (e.g., validity time) may be extended without resending the assistance data, by e.g. sending simply an indication by the configuring node. This configuring radio node may thus keep track of validity of the provided assistance data (e.g., run a timer or counter), and upon a triggering event or condition (e.g., expired timer or certain counter value), the configuring node may decide whether to extend or not validity of the earlier provided assistance data. In an example, the configuring node may also keep track of whether the earlier provided assistance data may or may not have extended validity (e.g., if at least one condition has changed which impacts the applicability of the assistance data or configuration of the configuring node or a neighbor node(s) has changed such that the assistance data would be impacted, validity may be not prolonged, otherwise it may be prolonged; note that the modified assistance data may or may not be provided if validity may be not prolonged).

Activation/Deactivation of the Assistance Data

In one example, the assistance data may be provided to a receiving measuring radio node, which may, e.g., become available for using by the receiving/measuring node radio immediately upon receiving and used by the node, or be stored by the receiving/measuring radio node and activated upon a triggering condition or triggering event (e.g., changed environment, changed radio network node configuration, changed CA configuration for the UE, changed set of CoMP links for the UE, changed interference conditions, handover, etc.), or indication from another node; the triggering may be autonomous in the node or with interaction with another node.

In an example, the assistance data may also be deactivated e.g. by the configuring node. For example, the receiving/ measuring node may have received the assistance data earlier from this or another configuring node (e.g., serving eNodeB) and may even used it. In yet another example, this assistance data may be even further used by the receiving node even in IDLE state. In yet another example, the receiving/measuring node may even change one or more geographical or logical areas (e.g., serving cells, local areas, or tracking areas) or environments (e.g., outdoor or indoor) and use the same assistance data received earlier. However, at some point in time the receiving/measuring node may deactivate the assistance data (see e.g. Validity embodiment) or may receive an indication or a message from another node indicating that the assistance data is not valid or not relevant (e.g., for this area or environment) or should not or may not be used by the receiving/measuring node. In an example, the receiving node may still store this assistance data or may remove it from the buffer or memory. In yet another example, the receiving/measuring node may receive an activation indication from another node (may be the same or different from that sending the deactivation) upon which the receiving/measuring node may start using again the assistance data.

By means of such activation/deactivation procedure, the signaling overhead may be reduced (no need to resend the assistance data at least sometimes, e.g., when the UE is entering and leaving the same building more than once or the UE has several typical residence locations such as home and work).

This embodiment may be implemented by the receiving/ measuring radio node (e.g., wireless device or a radio network node) but also by a network node (e.g., the configuring node, an eNodeB, a positioning node, etc.), where the network node may also keep track and maintain the assistance data (activation/deactivation) status associated with the receiving/measuring radio node. This status may also be provided by one network node to another network node, e.g., when the UE (which is the receiving/measuring node in an example) performs handover to another cell or another area.

The receiving/measuring radio node should be able also to associate activation/deactivation message with the assistance data. In one example, this may be implemented, e.g., by a message correlation ID or a condition (e.g., the assistance data and activation/deactivation message is provided by the same cell).

There may also be more than two activation/deactivation levels, e.g.,
Start using,
Temporarily stop using,
May resume using,
Stop using (e.g., may be removed from the memory e.g. because the network confirmation has changed).

In yet another example, instead or in addition to explicit activation/deactivation, there may also be pre-defined rules and/or conditions for activation/deactivation. There may also be a time for which the receiving/measuring node may be required to store the assistance data related to aggressor interference or inter-cell interference coordination. There may also be a minimum memory requirement for storing this assistance data (which may also be determined by the maximum amount of data the UE may receive over a pre-defined time period). For example, if the assistance data is provided/modified too frequently, the UE may be required to store only up to X bits of this information.

Example

Activation/Deactivation of the Assistance Data in CA

The assistance data herein relates to interference coordination and/or handling interference, e.g., aggressor interference. The assistance data may be provided pro-actively for at least one CC or SCell which may be deactivated or even not configured. The assistance data may be associated, e.g., with the MAC control element used for CA, e.g.:

| $C_7$ | $C_6$ | $C_5$ | $C_4$ | $C_3$ | $C_2$ | $C_1$ | R | Oct 1 | where the MAC CE has been described above. For example, the assistance data may be a structure or a set, where a subset i of the assistance data structure/set is associated with the corresponding $C_i$ element of the MAC CE or R element (for the assistance data for PCell or PCC). The radio node receiving an assistance data structure/set stores this assistance data and uses only the relevant parts of this assistance data upon the need, e.g., only for the activated SCells and PCell. When the radio node receives the MAC CE with a changed CA configuration, e.g., one or more elements of the octet above become 0 (instead of 1) or 1 (instead of 0), the radio node may also activate or deactivate the corresponding assistance data. For example, for the newly activated SCells it may also activate the corresponding parts of the earlier received assistance data structure/set. Similarly, for the newly deactivated SCells it may deactivate the corresponding parts of the earliers received assistance data structure/set. Activating and deactivating the assistance data may mean herein start using and stop using (temporarily), respectively, where start using and stop using may further comprise an action related to an operation with a memory, e.g., removing the deactivated part of the assistance data from the memory with quick access (e.g., virtual memory or RAM) and storing in a more permanent part of the memory (which may be accessed less often). Deconfiguring of an SCell or SCC may further mean remove from the fast-access memory and possibly even from the memory at all; in yet another example, the part of the assistance data corresponding to a deconfigured SCell or SCC may be stored in the history information.

Embodiment 4

Method of Using the Matching Results and/or Receiver Adaptation Statistics for Network Management Tasks The information related to the matching results between signals transmitted by an aggressor radio node (e.g., eNodeB) and the victim radio node (e.g., eNodeB) (e.g. table 1) and/or the information related to the adaptation of the receiver the adaptation performed by the receiving/measuring radio node (e.g. UE) based on the matching results can be used by the network (e.g., a radio node such as eNodeB or a network such as SON, O&M, coordinating node, etc.) for one or more network management tasks.

The network node (e.g., eNode B) may determine the receiving/measuring radio node's receiver adaptation implicitly based on feedback signaling and/or measurement results. Examples of feedback signaling are the CSI reports from UE, HARQ feedback (e.g., ACKnowledgment/Negative ACKnowledgment (ACK/NACK)) sent by the UE on downlink channel receptions, signal strength and/or signal quality reports, etc. The network node (e.g., eNode B) may also determine the radio node's receiver adaptation explicitly based on explicit indication from the radio node e.g. statistics reported by the UE.

In one example of network management task the network node which obtains information matching results and/or the information related to the adaptation of the receiver may signal or forward the obtained information to another network node. Examples of other network nodes are: neighboring radio nodes (e.g., neighbor eNodeBs and/or wireless devices), relay, SON node, O&M, OSS, MDT node, positioning node etc. These nodes may use this information for network planning, deployment of new nodes in the network, upgrade or modification of the network configuration, tuning of network parameters, creation of assistance data, etc.

Yet another example of the network management task is the configuration of signal transmissions in victim and/or aggressor radio nodes. This is further elaborated below:

Configuring a Victim and/or Aggressor Transmission Accounting for a Matching Result Matching results (see e.g. Embodiment 1) may be used for configuring victim and/or aggressor transmissions to optimize the matching result, e.g., ensure at least one of:
 reduce the overlap ratio for victim and aggressor signals, and
 reduce performance impact of the aggressor,
when victim signals are characterized by a critical performance impact level from the aggressor. This can be implemented by controlling the parameters that impact the input used by the matching step, e.g.,
 change the set of victim-aggressor relations, e.g.,
  configure aggressor or victim signals or measurements on a different carrier (the flexibility provided by new carrier types may also be exploited here),
  reconfigure transmit activity of victim signals (e.g., use other time- and/or frequency resource when possible, increase the density of victim signals, etc.)
  reconfigure transmit activity of aggressor signals (e.g., reduce transmission probability, time- and/or frequency resources used for transmissions, reduce transmit power, configure ABS, configure DTX, increase the time minimum time interval between periodic aggressor signal instances, configure a sleep mode for the aggressor radio node, decide to not transmit specific signal type e.g. CRS on a new carrier type, etc.).

The (re)configuring of victim and/or aggressor transmissions to optimize the matching result may also be preceded by determining the need for the (re)configuring. For example, the need may be determined based on
 another node's request,
 analyzing collected measurements or performance statistics for receivers in aggressor interference conditions (e.g., the need is determined with >=X % of failed or low-quality measurements for UEs in CRE zone),
 analyzing MDT logs,
 determining the presence of at least N (e.g., N=>1) receiving/measuring radio node in aggressor interference conditions where the presence may be determined e.g, based on indication or any message received from receiving/measuring radio node in aggressor interference conditions, or based on location information about the receiving/measuring node, etc.

Various embodiments disclosed herein may provide one or more of the potential additional advantages listed below, among others.

An advantage of some of the embodiments herein is the ability to define aggressor signals or transmitters.

An further advantage of some of the embodiments herein is that they allow to better manage the assistance data for handling the aggressor interference.

A yet further advantage of some of the embodiments herein is that they allow to configure victim and aggressor transmissions adaptive to matching results, e.g., dynamically or semi-statically.

Another advantage of some of the embodiments herein is that they allow to reuse/activate/deactivate the assistance data at the receiving/measuring radio node without redundant signaling of the same data.

Abbreviations:
3GPP 3$^{rd}$ Generation Partnership Project
BS Base Station
CRS Cell-specific Reference Signal
DL Downlink
eICIC enhanced Inter-Cell Interference Coordination eNodeB evolved Node B
E-SMLC Evolved SMLC
IE Information Element
LTE Long-Term Evolution
MDT Minimization of Drive Tests
PCI Physical Cell Identity
RF Radio Frequency
RRC Radio Resource Control
RSRP Reference Signal Received Power
RSRQ Reference Signal Received Quality
RSSI Received Signal Strength Indicator
SINR Signal-to-Interference Ratio
SON Self-Optimized Network
SRS Sounding Refence Signals
UE User Equipment
UL Uplink
UMTS Universal Mobile Telecommunications System
UTDOA UL Time Difference of Arrival In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification shall support claims to any such combination or subcombination.

The invention claimed is:

1. A method in a first radio node for adapting a receiver type in the first radio node, the first radio node comprising a receiver that is configured to selectively operate according to at least a first receiver type and a second receiver type, the two receiver types being different, and the first radio node being comprised in a wireless communications network, the wireless communications network further comprising a second radio node and at least one third radio node, and the method comprising:
adapting the receiver of the first radio node to selectively operate according to one of the first receiver type and the second receiver type, for receiving first signals from the second radio node, wherein the adapting selects between the first receiver type and the second receiver type based on a determination made from a relation between an activity of the first signals and second signals received from the at least one third radio node, wherein the first signals comprise signals received from a first cell associated with the second radio node, wherein the second signals comprise signals received from a second cell associated with the at least one third radio node, and wherein the second signals from the at least one third radio node cause interference on the first signals,
wherein adapting the receiver comprises configuring the receiver of the first radio node to operate according to the one of the first receiver type or the second receiver type, and
wherein the first receiver type and second receiver type are different from each other with respect to operations performed by the receiver to mitigate interference.

2. The method of claim 1, wherein the selecting is based on the determination made from the relation between an activity of the first signals that are received from the second radio node and activity of the second signals that cause interference on the first signals that is obtained through obtaining a matching result using, as input, information about the first signals and information about the second signals.

3. The method of claim 1, wherein the selecting is based on the determination made from the relation between an activity of the first signals that are received from the second radio node and activity of the second signals that cause interference on the first signals that comprises a relation between a number of transmit antenna ports used for transmitting the first signals and a number of transmit antenna ports used for transmitting the second signals.

4. The method of claim 1, wherein the selecting is based on the determination made from the relation between an activity of the first signals that are received from the second radio node and activity of the second signals that cause interference on the first signals that comprises a relation between a transmit bandwidth of the first signals and a transmit bandwidth of the second signals.

5. The method of claim 1, wherein the first signals and the second signals are of different type.

6. The method of claim 1, further comprising adapting the receiver by selecting between the first receiver type and the second receiver type based on a determination made from a relation between characteristics of the first signals and the second signals.

7. The method of claim 1, wherein the activity of the first signals and the second signals comprises at least one of: time and/or frequency resources when a transmission may occur and/or when the transmission may not occur, transmission probability, and transmission power level.

8. The method of claim 6, further comprising obtaining information related to the activity or characteristics, of the first signals and the second signals, by at least one of: autonomously, based on a pre-defined rule, based on capability of the first radio node, based on an indication received from another node, derived based on collected statistics indicative of performance of certain signals due to high interference,
wherein the adapting the receiver is performed based on the information.

9. The method of claim 8, wherein the obtaining information further comprises obtaining assistance data from another node in the wireless communications network.

10. The method of claim 1, wherein each of the receiver types is one of: a first receiver type, a second receiver type and a third receiver type,
wherein the receiver operating according to the first receiver type is not capable of operating to mitigate interference experienced from the at least one third radio node or it is capable of operating to mitigate the interference only if it is below a certain threshold level,
wherein the receiver operating according to the second receiver type and the third receiver type is capable of operating to mitigate the interference received from the at least one third radio node at least for interference of a certain type, and wherein, at least in some scenarios, the second receiver type is more efficient in terms of one or more of: resource consumption and interference handling performance, than the third receiver type.

11. The method of claim 1, wherein the adapting is further based on at least one of: time alignment of the first signals and the second signals, receiver activity of the first radio node, synchronization level or accuracy between the second radio node and the at least one third radio node, receiver capability related to managing the interference from the at least one third radio node, second radio node measurement quality or channel reception quality, an indication that the at least one third radio node is an aggressor critical for the first radio node, an indication that the second radio node is a victim with respect to the at least one third radio node, physical impact of the at least one third radio node on the second radio node, a performance impact estimate, overall impact accounting for overlap and performance impact, availability of assistance data which is valid and applicable for a candidate receiver type, absolute and/or relative received signal powers of the second radio node and the at least one third radio node, overlap ratio, overlap density, number of simultaneous victims, number of simultaneous aggressors, speed of the first radio node, when the first radio node is a wireless device, receiver switching capability, capability of using one or more receivers in parallel, bandwidths, expanding measurement bandwidth, number of parallel measurements, hardware resources, currently available or unused hardware resources, battery level, activity state or activity level, target quality of a measurement or channel reception at the first radio node, collected receiver type statistics of resource consumption and/or performance characteristics, relation between CP lengths of the first signals and the second signals, CP length of the signals, validity of the assistance data, activation_or_deactivation status of the assistance data.

12. A method in a node for assisting a first radio node in adapting a receiver type in the first radio node for receiving signals from a second radio node, the first radio node comprising a receiver that is configured to selectively operate according to at least two receiver types, and the node, the first radio node, and the second radio node being comprised in a wireless communications network, the method comprising:
   determining assistance data, the assistance data being for assisting the first radio node in adapting the receiver in the first radio node to selectively operate according to one of the at least two receiver types, for receiving first signals from the second radio node, wherein the adapting selects between the at least two receiver types based on a determination made from the assistance data, wherein the assistance data is related to activity of the first signals and second signals received from at least one third radio node, wherein the first signals comprise signals received from a first cell associated with the second radio node, wherein the second signals comprise signals received from a second cell associated with the at least one third radio node, wherein the at least one third radio node is comprised in the wireless communications network, and wherein the second signals from the at least one third radio node cause interference on the first signals; and
   signalling the assistance data to the first radio node,
   wherein adapting the receiver comprises configuring the receiver of the first radio node to operate according to the one of the at least two receiver types, and
   wherein the at least two receiver types are different from each other with respect to operations performed by the receiver to mitigate interference.

13. The method of claim 12, wherein the assistance data for assisting the first radio node in adapting a receiver type in the first radio node for receiving the first signals is further related to characteristics of the first signals and the second signals.

14. The method of claim 13, wherein determining assistance data comprises determining that the at least one third radio node is an aggressor, wherein the determining is based on information from the second radio node, information from the at least one third radio node, and at least one matching result or relation between one of: activity and characteristics, of the first signals and the second signals.

15. The method of claim 12, wherein the assistance data comprises at least one of: time alignment of the first signals and the second signals, receiver activity of the first radio node, synchronization level or accuracy between the second radio node and the at least one third radio node, receiver capability related to managing the interference from the at least one third radio node, second radio node measurement quality or channel reception quality, an indication that the at least one third radio node is an aggressor critical for the first radio node, an indication that the second radio node is a victim with respect to the at least one third radio node, physical impact of the at least one third radio node on the second radio node, a performance impact estimate, overall impact accounting for overlap and performance impact, an identification identifying an aggressor signal, an identification identifying the aggressor transmitter, aggressor transmitter activity information, a receiver type indication for which the assistance data may apply, one or more of cell identifications, a time alignment indicator with respect to a reference transmitter, relative timing of an aggressor transmitter with respect to a reference transmitter or reference time, Multicast-Broadcast Single Frequency Network, MBSFN, configuration information and transmissions in the MBSFN subframes, a logical or geographical area associated with the MBSFN configuration, and at least one of: System Information-Radio Network Temporary Identifier, SI-RNTI, Random Access-RNTI, Paging-RNTI or Cell-RNTI for receiving and decoding an aggressor interference of a specific aggressor transmission, an indicator associating a data set comprised in the assistance data with a receiver capability, an indicator associating a data set comprised in the assistance data with a receiver type, and aggressor type.

16. The method of claim 12, further comprising adapting one or more network management tasks based on at least one of: the determined assistance data and receiver adaptation statistics.

17. The method of claim 16, wherein the one or more network management tasks comprise:
   configuring one of: the first signals and the second signals, to lower interference from the at least one third radio node towards the first radio node when receiving the first signals, and
   forwarding the at least one of: the determined assistance data and receiver adaptation statistics to another node in the wireless communications network for network planning and configuration of parameters.

18. The method of claim 12, wherein the method further comprises managing the assistance data, wherein managing comprises at least one of: building up or updating the assistance data, deciding when the assistance data is to be provided or updated, deciding how the assistance data is to be provided, maintaining a database used for building up the assistance data, obtaining or collecting measurements and/or statistics for using when building up the assistance data, activating/deactivating assistance data, and determining a need for the configuring of signals,
   wherein the node is remote from the first radio node in the wireless communications network.

19. The method of claim 12, wherein each of the receiver types is one of: a first receiver type, a second receiver type and a third receiver type,
   wherein the receiver operating according to the first receiver type is not capable of operating to mitigate interference experienced from the at least one third radio node or it is capable of operating to mitigate the interference only if it is below a certain threshold level,
   wherein the receiver operating according to the second receiver type and the third receiver type is capable of operating to mitigate the interference received from the at least one third radio node at least for interference of a certain type, and wherein, at least in some scenarios, the second receiver type is more efficient in terms of one or more of: resource consumption and interference handling performance, than the third receiver type.

20. A first radio node for adapting a receiver type in the first radio node, the first radio node comprising a receiver that is configured to selectively operate according to at least a first receiver type and a second receiver type, the two receiver types being different, and the first radio node being adapted to be comprised in a wireless communications network, the wireless communications network further comprising a second radio node and at least one third radio node, and the first radio node comprising:

an adapting circuit configured to adapt the receiver of the receiver of the first radio node to selectively operate according to one of the first receiver type and the second receiver type, for receiving first signals from the second radio node, wherein the adapting circuit is configured to select between the first receiver type and the second receiver type based on a determination made from a relation between an activity of the first signals and second signals received from the at least one third radio node, wherein the first signals comprise signals received from a first cell associated with the second radio node, wherein the second signals comprise signals received from a second cell associated with the at least one third radio node, and wherein the second signals from the at least one third radio node cause interference on the first signals, wherein adapting the receiver comprises configuring the receiver of the first radio node to operate according to the one of the first receiver type or the second receiver type, and wherein the first receiver type and second receiver type are different from each other with respect to operations performed by the receiver to mitigate interference.

21. The first radio node of claim 20, wherein the selecting is based on the determination made from the relation between an activity of the first signals that are received from the second radio node and activity of the second signals that cause interference on the first signals that is configured to be obtained through obtaining a matching result using, as input, information about the first signals and information about the second signals.

22. The first radio node of claim 20, wherein the selecting is based on the determination made from the relation between an activity of the first signals that are received from the second radio node and activity of the second signals that cause interference on the first signals that comprises a relation between a number of transmit antenna ports used for transmitting the first signals and the second signals.

23. The first radio node claim 20, wherein the selecting is based on the determination made from the relation between an activity of the first signals that are received from the second radio node and activity of the second signals that cause interference on the first signals that comprises a relation between a transmit bandwidth of the first signals and a transmit bandwidth of the second signals.

24. The first radio node of claim 20, wherein the first signals and the second signals are of different type.

25. The first radio node of claim 20, wherein the adapting circuit is further configured to adapt the receiver by selecting between the first receiver tvype and the second receiver type based on a determination made from a relation between characteristics of the first signals and the second signals.

26. The first radio node of claim 20, wherein the activity of the first signals and the second signals comprises at least one of: time and/or frequency resources when a transmission may occur and/or when the transmission may not occur, transmission probability, and transmission power level.

27. The first radio node of claim 26, further comprising an obtaining circuit configured to obtain information related to the activity or characteristics, of the first signals and the second signals, by at least one of: autonomously, based on a pre-defined rule, based on capability of the first radio node, based on an indication received from another node, derived based on collected statistics indicative of performance of certain signals due to high interference, wherein the adapting the receiver is performed based on the information.

28. The first radio node of claim 27, wherein the obtaining circuit is further configured to obtain assistance data from another node in the wireless communications network.

29. The first radio node of claim 20, wherein each of the receiver types is one of: a first receiver type, a second receiver type and a third receiver type, wherein the receiver operating according to the first receiver type is not capable of operating to mitigate interference experienced from the at least one third radio node or it is capable of operating to mitigate the interference only if it is below a certain threshold level, wherein the receiver operating according to the second receiver type and the third receiver type is capable of operating to mitigate the interference received from the at least one third radio node at least for interference of a certain type, and wherein, at least in some scenarios, the second receiver type is more efficient in terms of one or more of: resource consumption and interference handling performance, than the third receiver type.

30. The first radio node of claim 20, wherein the adapting circuit is further configured to adapt based on at least one of: time alignment of the first signals and the second signals, receiver activity of the first radio node, synchronization level or accuracy between the second radio node and the at least one third radio node, receiver capability related to managing the interference from the at least one third radio node, second radio node measurement quality or channel reception quality, an indication that the at least one third radio node is an aggressor critical for the first radio node, an indication that the second radio node is a victim with respect to the at least one third radio node, physical impact of the at least one third radio node on the second radio node, a performance impact estimate, overall impact accounting for overlap and performance impact, availability of assistance data which is valid and applicable for a candidate receiver type, absolute and/or relative received signal powers of the second radio node and the at least one third radio node, overlap ratio, overlap density, number of simultaneous victims, number of simultaneous aggressors, speed of the first radio node, when the first radio node is a wireless device, receiver switching capability, capability of using one or more receivers in parallel, bandwidths, expanding measurement bandwidth, number of parallel measurements, hardware resources, currently available or unused hardware resources, battery level, activity state or activity level, target quality of a measurement or channel reception at the first radio node, collected receiver type statistics of resource consumption and/or performance characteristics, relation between CP lengths of the first signals and the second signals, CP length of the signals, validity of the assistance data, and activation_or_deactivation status of the assistance data.

31. A node for assisting a first radio node in adapting a receiver type in the first radio node for receiving signals from a second radio node, the first radio node comprising a receiver that is configured to selectively operate according to at least two receiver types, and the node, the first radio node, and the second radio node being adapted to be comprised in a wireless communications network, the node comprising:

a determining circuit configured to determine assistance data, the assistance data being for assisting the first radio node in adapting the receiver in the first radio node to selectively operate according to one of the at least two receiver types, for receiving first signals from the second radio node, wherein the adapting selects between the at least two receiver types based on a determination made from the assistance data, wherein the assistance data is related to activity of the first signals and second signals received from at least one third radio node, wherein the first signals comprise signals received from a first cell associated with the second radio node, wherein the second signals comprise signals received from a second cell associated with the at least one third radio node, wherein the at least one third radio node is adapted to be comprised in the wireless communications network, and wherein the second signals from the at least one third radio node cause interference on the first signals; and a signalling circuit configured to signal the assistance data to the first radio node, wherein adapting the receiver comprises configuring the receiver of the first radio node to operate according to the one of the at least two receiver types, and wherein the at least two receiver types are different from each other with respect to operations performed by the receiver to mitigate interference.

32. The node of claim 31, wherein the assistance data for assisting the first radio node in adapting a receiver type in the first radio node for receiving the first signals is further related to characteristics of the first signals and the second signals.

33. The node of claim 32, wherein the determining circuit is further configured to determine that the at least one third radio node is an aggressor, based on information from the second radio node, information from the at least one third radio node, and at least one matching result or relation between one of: activity and characteristics, of the first signals and the second signals.

34. The node of claim 31, wherein the assistance data comprises at least one of: time alignment of the first signals and the second signals, receiver activity of the first radio node, synchronization level or accuracy between the second radio node and the at least one third radio node, receiver capability related to managing the interference from the at least one third radio node, second radio node measurement quality or channel reception quality, an indication that the at least one third radio node is an aggressor critical for the first radio node, an indication that the second radio node is a victim with respect to the at least one third radio node, physical impact of the at least one third radio node on the second radio node, a performance impact estimate, overall impact accounting for overlap and performance impact, an identification identifying an aggressor signal, an identification identifying the aggressor transmitter, aggressor transmitter activity information, a receiver type indication for which the assistance data may apply, one or more of cell identifications, a time alignment indicator with respect to a reference transmitter, relative timing of an aggressor transmitter with respect to a reference transmitter or reference time, Multicast-Broadcast Single Frequency Network, MBSFN, configuration information and transmissions in the MBSFN subframes, a logical or geographical area associated with the MBSFN configuration, and at least one of: System Information-Radio Network Temporary Identifier, SI-RNTI, Random Access-RNTI, Paging-RNTI or Cell-RNTI for receiving and decoding an aggressor interference of a specific aggressor transmission, an indicator associating a data set comprised in the assistance data with a receiver capability, an indicator associating a data set comprised in the assistance data with a receiver type, and aggressor type.

35. The node of claim 31, further comprising an adapting circuit configured to adapt one or more network management tasks based on at least one of: the determined assistance data and receiver adaptation statistics.

36. The node of claim 35, wherein the one or more network management tasks comprise:

configuring one of: the first signals and the second signals, to lower interference from the at least one third radio node towards the first radio node when receiving the first signals, and forwarding the at least one of: the determined assistance data and receiver adaptation statistics to another node in the wireless communications network for network planning and configuration of parameters.

37. The node of claim 31, further comprising a managing circuit configured to manage the assistance data, wherein to manage comprises being configured to at least one of: build up or update the assistance data, decide when the assistance data is to be provided or updated, decide how the assistance data is to be provided, maintain a database used for building up the assistance data, obtain or collect measurements and/or statistics for using when building up the assistance data, activate/deactivate assistance data, and determine a need for the configuring of signals, wherein the node is remote from the first radio node in the wireless communications network.

38. The node of claim 31, wherein each of the receiver types is one of: a first receiver type, a second receiver type and a third receiver type, wherein the receiver operating according to the first receiver type is not capable of operating to mitigate interference experienced from the at least one third radio node or it is capable of operating to mitigate the interference only if it is below a certain threshold level, wherein the receiver operating according to the second receiver type and the third receiver type is capable of operating to mitigate the interference received from the at least one third radio node at least for interference of a certain type, and wherein, at least in some scenarios, the second receiver type is more efficient in terms of one or more of: resource consumption and interference handling performance, than the third receiver type.

* * * * *